(12) United States Patent
Hoffmeister et al.

(10) Patent No.: US 12,412,567 B1
(45) Date of Patent: Sep. 9, 2025

(54) LOW LATENCY AUDIO PROCESSING TECHNIQUES

(71) Applicant: Amazon Technologies, Inc., Seattle, WA (US)

(72) Inventors: Bjorn Hoffmeister, Seattle, WA (US); Ariya Rastrow, Seattle, WA (US); Grant Strimel, Presto, PA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 17/308,550

(22) Filed: May 5, 2021

(51) Int. Cl.
*G10L 15/16* (2006.01)
*G06N 3/045* (2023.01)
*G10L 15/06* (2013.01)

(52) U.S. Cl.
CPC .............. *G10L 15/16* (2013.01); *G06N 3/045* (2023.01); *G10L 15/063* (2013.01)

(58) Field of Classification Search
CPC ........ G10L 15/16; G10L 15/063; G06N 3/045
See application file for complete search history.

(56) References Cited

U.S. PATENT DOCUMENTS

| | | |
|---|---|---|
| 5,619,554 A | 4/1997 | Hogan et al. |
| 6,993,245 B1 | 1/2006 | Harville |
| 7,689,423 B2 | 3/2010 | Bicego et al. |
| 8,121,277 B2 | 2/2012 | Baird |
| 8,165,886 B1 | 4/2012 | Gagnon et al. |
| 8,363,808 B1 | 1/2013 | Bland et al. |
| 8,781,812 B2 | 7/2014 | Kadirkamanathan et al. |
| 8,949,266 B2 | 2/2015 | Phillips et al. |
| 9,230,541 B2 | 1/2016 | Li et al. |
| 9,275,637 B1 | 3/2016 | Salvador et al. |
| 9,311,932 B2 | 4/2016 | Carter |
| 9,368,105 B1 | 6/2016 | Freed et al. |
| 9,442,910 B2 | 9/2016 | Liu et al. |
| 9,445,209 B2 | 9/2016 | Dadu et al. |
| 9,548,053 B1 | 1/2017 | Basye et al. |
| 9,576,593 B2 | 2/2017 | Pakhomov et al. |
| 9,854,139 B2 | 12/2017 | Thorn et al. |
| 10,051,115 B2 | 8/2018 | Redmann |

(Continued)

OTHER PUBLICATIONS

Huang, Che-Wei, et al. "A Study for Improving Device-Directed Speech Detection Toward Frictionless Human-Machine Interaction." Interspeech. 2019, pp. 3342-3346. (Year: 2019).*

*Primary Examiner* — Jesse S Pullias
*Assistant Examiner* — Michael C. Lee
(74) *Attorney, Agent, or Firm* — Pierce Atwood LLP

(57) ABSTRACT

Techniques for reducing latency in processing of audio data, where the latency may be caused in detecting audio of interest in the audio data, are described. A device that captures audio data may include a detection component to determine when the audio data includes audio of interest (e.g., device-directed speech), and an audio embedding generator to generate embedding vectors for the captured audio data while the detection component processes the audio data. The device may generate an embedding vector for audio data captured at the device for a duration of time; determine, at the end of the duration of time, that the audio data represents audio of interest; and send the embedding vector to an audio processing component (e.g., an automatic speech recognition component) for processing.

19 Claims, 16 Drawing Sheets

(56) References Cited

U.S. PATENT DOCUMENTS

| | | |
|---|---|---|
| 10,051,366 B1 | 8/2018 | Buoni et al. |
| 10,192,546 B1 | 1/2019 | Piersol et al. |
| 10,304,465 B2 | 5/2019 | Gunn et al. |
| 10,339,918 B2 | 7/2019 | Hofer et al. |
| 10,339,920 B2 | 7/2019 | Adams et al. |
| 10,381,002 B2 | 8/2019 | Gunn et al. |
| 10,391,636 B2 | 8/2019 | Breazeal |
| 10,643,606 B2 | 5/2020 | Piersol et al. |
| 10,679,605 B2 | 6/2020 | Gruber et al. |
| 10,705,794 B2 | 7/2020 | Gruber et al. |
| 10,896,675 B1 * | 1/2021 | Lam .................. G10L 15/30 |
| 11,710,478 B2 | 7/2023 | Piersol et al. |
| 2002/0198722 A1 | 12/2002 | Yuschik |
| 2007/0061152 A1 | 3/2007 | Doi |
| 2012/0010873 A1 | 1/2012 | Kim et al. |
| 2013/0275899 A1 | 10/2013 | Schubert et al. |
| 2016/0055847 A1 | 2/2016 | Dahan |
| 2020/0020322 A1 * | 1/2020 | Guevara .............. G10L 15/02 |
| 2020/0279552 A1 | 9/2020 | Piersol et al. |
| 2020/0312308 A1 * | 10/2020 | Xu ..................... G10L 15/32 |
| 2022/0013126 A1 * | 1/2022 | Haynor ............... G10L 15/26 |
| 2022/0093095 A1 * | 3/2022 | Dighe ................. G10L 15/26 |
| 2022/0165277 A1 * | 5/2022 | Kracun ............... G10L 15/30 |
| 2022/0189466 A1 * | 6/2022 | Sharifi ............... G10L 15/22 |
| 2022/0189467 A1 * | 6/2022 | Khalil ................ G10L 15/08 |
| 2022/0189471 A1 * | 6/2022 | Sharifi ............... G10L 15/08 |
| 2022/0310072 A1 * | 9/2022 | Sainath ............... G10L 15/05 |

* cited by examiner

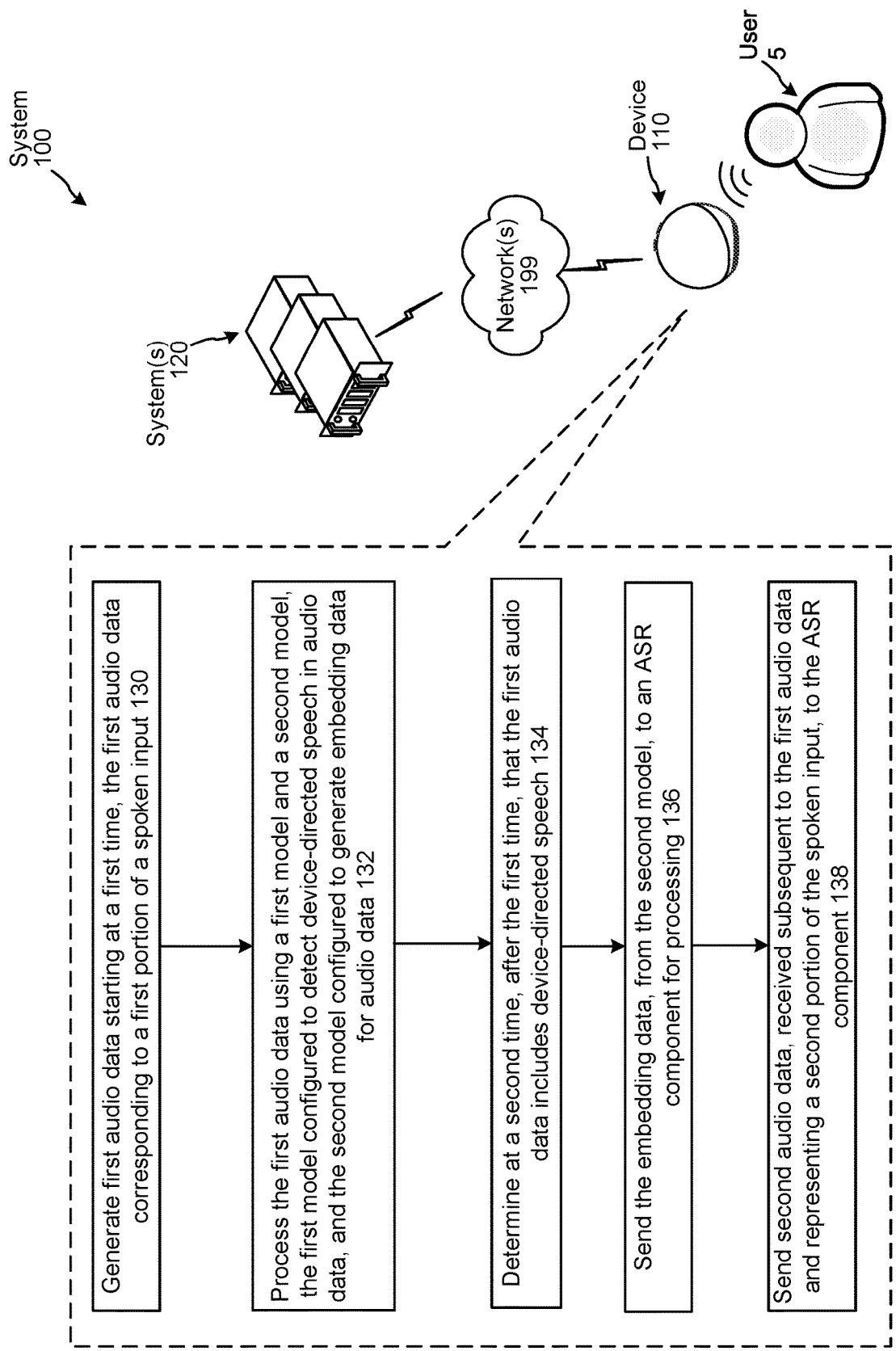

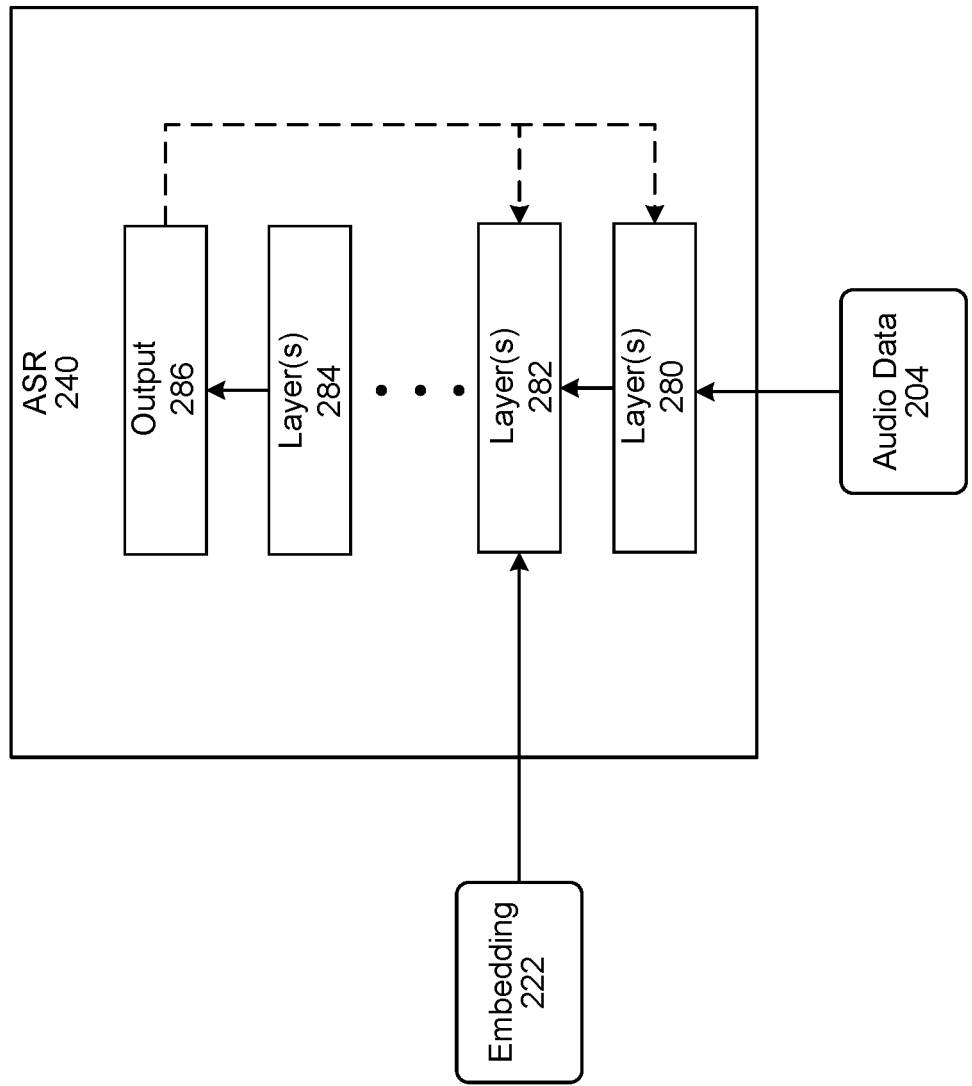

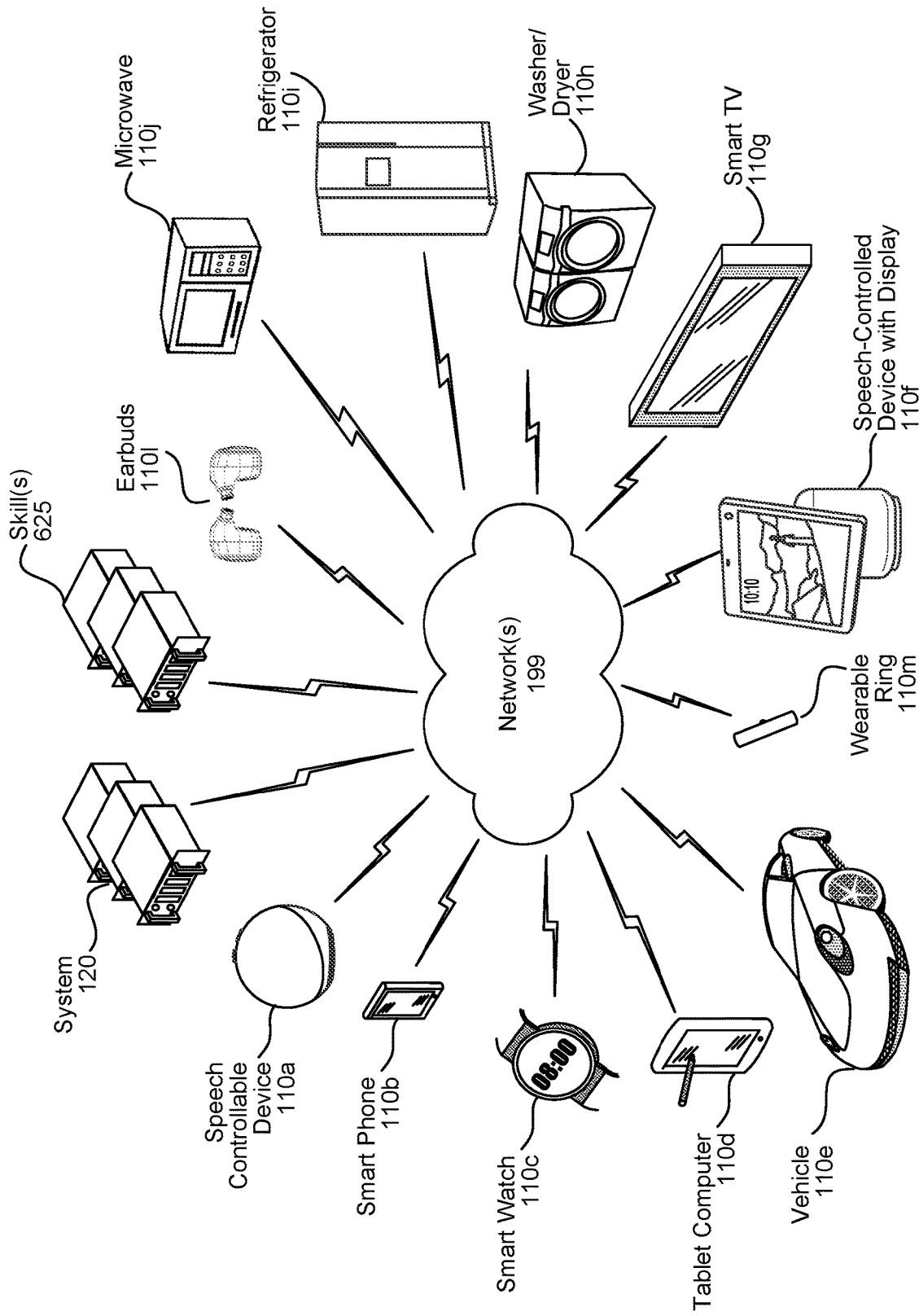

LOW LATENCY AUDIO PROCESSING TECHNIQUES

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to process audio data including speech, according to embodiments of the present disclosure.

FIG. 2C is a conceptual diagram illustrating how an ASR component may process embedding data and audio data, according to embodiments of the present disclosure.

FIG. 13 illustrates an example of a computer network for use with the overall system, according to embodiments of the present disclosure.

DETAILED DESCRIPTION

Figure 2A:
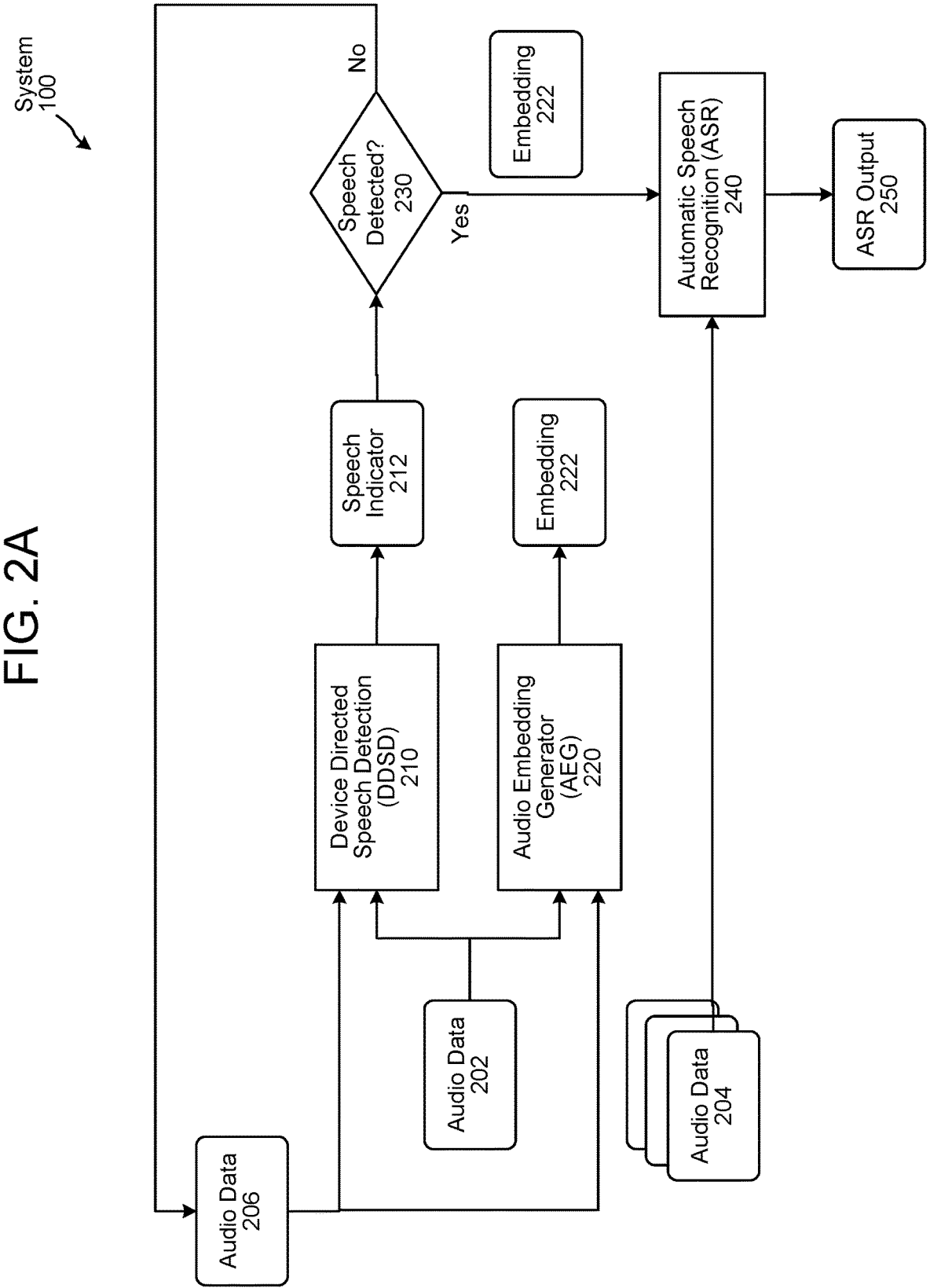
FIGS. 2A and 2B show how a system may process audio data to determine whether it includes device-directed speech, according to embodiments of the present disclosure.

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

Certain systems may be configured to perform actions responsive to spoken user inputs. For example, for the user input of "Alexa, play music by [artist]," a system may output music by the indicated artist. In a further example, for the user input "Alexa, turn on the lights," a system may cause the lights to be turned on based on the user's location.

Before processing audio data including a spoken input, a system may determine whether the audio data includes speech directed to the system. Some systems may make this determination based on the audio data including a wakeword (i.e., "Alexa" in the aforementioned user input examples). Once speech is detected, then an automatic speech recognition (ASR) component may start transcribing the speech until the end of device-directed speech is detected. However, such processing may result in (small amounts of) latency. An ASR component may run with a certain real-time factor (RTF). For example, an RTF of 1 may mean that the ASR component requires N seconds to transcribe N seconds of speech, where as an RTF of 0.5 may mean that the ASR system requires N/2 seconds to transcribe N seconds of speech.

In an example to illustrate the latency problem, assume speech starts at time T but it takes the system until time T+H to detect that device-directed speech is coming in, that is, the ASR component begins processing its input (e.g., audio data) at time T+H. To produce the most accurate speech transcription, the ASR component has to go back and start transcribing data representing speech received at time T. Assume that the end of device-directed speech is triggered at time N with N>H. This means the ASR component has to transcribe a recording of length N in time N−H. Thus, the RTF of the ASR component has to be <0.5 in order to not introduce latency.

The present disclosure provides techniques to reduce or eliminate latency in starting downstream processing that may be caused by a processing latency of an upstream component (e.g., processing to determine device-directed speech in audio data). The present disclosure provides a component (e.g., an audio embedding generator) that continuously processes input (audio) data captured by a device and generates embedding data corresponding to the audio data. When, for example, device-directed speech is detected, the already generated embedding data is sent to an ASR component for processing. The embedding data determined by the audio embedding generator may capture information for audio data that is received while the device is detecting device-directed speech. Rather than going back, in a buffer, for the audio data corresponding to the start of the speech, the ASR component can process the embedding data corresponding to the start of the speech.

In some embodiments, the ASR component may employ one or more neural network(s) to enable taking in the embedding data as input. In some embodiments, the audio embedding generator and the ASR component may be jointly trained. In some embodiments, a component configured to detect device-directed speech may be combined with the component configured to generate embedding data.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIG. 1 is a conceptual diagram illustrating a system 100 configured to process audio data including speech, according to embodiments of the present disclosure. Although the figure and discussion of the present disclosure illustrate certain steps in a particular order, the steps described may be performed in a different order (as well as certain steps removed or added) without departing from the present disclosure. As shown in FIG. 1, the system 100 may include the device 110 (local to a user 5) and the system(s) 120, in communication across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The device 110 generates (130) first audio data starting at a first time, the first audio data corresponding to a first portion of a spoken input. The user 5 may speak one or more words in the vicinity of the device 110. One or more microphones of the device 110 may capture first audio, which may include the user's 5 speech starting at the first time, and generate the first audio data therefrom. The device 110 may continue capturing audio (and generating corresponding audio data) after the first time. The first audio data may represent audio captured during a duration of time.

The device 110 processes (132) the first audio data using a first model and a second model, the first model configured to detect device-directed speech in audio data and the second model configured to determine embedding data. The device 110 may include the first model as part of a device-directed speech detection (DSDD) component (e.g., DSDD component 210 described below). The device 110 may include the second model as part of an audio embedding generator (AEG) component (e.g., AEG component 220 described below). The device 110 may process the first audio data using the second model to determine embedding data corresponding to the first audio data.

The device 110 determines (134), at a second time after the first time, that the first audio data includes device-directed speech. Processing by the first model to detect device-directed speech may take some time. The embedding data generated by the second model may correspond to the first audio data starting at the first time until the second time.

The device 110 sends (136) the embedding data, from the second model, to an ASR component for processing. The device 110 may send the embedding data in response to the first model detecting device-directed speech in the first audio data. The device 110 may send the embedding data to an ASR component that is included in the device 110 itself. In other embodiments, the device 110 may send the embedding data to an ASR component included in the system(s) 120.

The device 110 sends (138) second audio data, received subsequent to the first audio data and representing a second portion of the spoken input, to the ASR component. In doing so, the device 110 may send the remaining audio data corresponding to the spoken input to the ASR component for processing. As such, the system 100 may send, to the ASR component, embedding data corresponding to the beginning of the spoken input and second audio data corresponding to the rest of the spoken input. Sending the embedding data may reduce or eliminate latency in processing the spoken input, where the latency may be caused in the first model detecting speech in the first audio data.

Referring to FIG. 2A, in example embodiments, the system 100 may include a device-directed speech detection (DDSD) component 210, an audio embedding generator (AEG) component 220, a decision block 230, and an automatic speech recognition (ASR) component 240. In some embodiments, the DDSD component 210, the AEG component 220 and the decision block 230 may be implemented at the device 110 and the ASR component 240 may be implemented at the system(s) 120. In such embodiments, the device 110, using the DSDD component 210 and the AEG component 220, may process the audio data 202 (representing runtime received audio of an environment surrounding the device 110), and if the audio data 202 includes device-directed speech (output of the decision block 230), then the device 110 may send embedding data 222 to the system(s) 120 so that the ASR component 240 at the system(s) 120 may process the embedding data 222. The device 110 may then send any subsequently received audio data, for example, audio data 204, that is part of the same spoken input, directly to the system(s) 120 so that the ASR component 240 may process the audio data 204.

In other embodiments, the DDSD component 210, the AEG component 220, the decision block 230, and the ASR component 240 may be implemented at the device 110. In such embodiments, the device 110, using the DSDD component 210 and the AEG component 220, may process the audio data 202, and if the audio data 202 includes device-directed speech (based on the output of the decision block 230), then the device 110 may send embedding data 222 to the on-device ASR component 240 for processing. Any subsequently received audio data, for example, audio data 204, that is part of the same spoken input, may be provided directly to the on-device ASR component 240.

The audio data 202 may correspond to audio captured by a microphone(s) of (or otherwise associated with) the device 110. In some cases, the audio data 202 may include speech from the user 5. In other cases, the audio data 202 may not include speech. The audio data 202 may correspond to audio of a predetermined length (e.g., one second, two seconds, etc.). In some embodiments, the audio data 202 may be a frequency domain representation of the audio captured by the device 110, where the audio data 202 may be determined by performing a Fast Fourier Transform (FFT) on the captured audio.

The DSDD component 210 may process the audio data 202 at the same time as the AEG component 220 may process the audio data 202 (e.g., synchronous processing). The DSDD component 210 may process the audio data 202 to determine whether the audio data 202 includes device-directed speech. The DSDD component 210 may output a speech indicator (e.g., a flag) 212 representing whether the audio data 202 includes device-directed speech. The speech indicator 212 may be a Boolean value (e.g., 1 or 0; true or false; yes or no; etc.). In other embodiments, the speech indicator 212 may be a numerical value (e.g., a probability value, a confidence score, etc.) representing a likelihood/probability of the audio data 202 including device-directed speech and/or the DSDD component's 210 confidence in determining that the audio data 202 includes device-directed speech.

In some embodiments, the DSDD component 210 may determine whether the audio data includes speech directed to the particular device 110 (that captured the corresponding audio). In some embodiments, the DSDD component 210 may determine whether the audio data includes speech directed to any one or more of the devices 110 (for example, the devices 110 shown in FIG. 13) that may be configured to work with the system(s) 120. In other words, the DSDD component 210 may be trained specific to the device 110, or generally to devices configured to work with the system(s) 120.

A microphone or array of microphones (of or otherwise associated with a device 110) may capture audio. In some embodiments, the DSDD component 210 may process the audio data 202, representing the audio, to first determine whether speech is detected (even speech that is not directed to the device). The device 110 may use various techniques to determine whether audio data includes speech. In some examples, the DSDD component 210 may apply voice activity detection (VAD) techniques. Such techniques may determine whether speech is present in the audio data 202 based on various quantitative aspects of the audio data 202, such as the spectral slope between one or more frames of the audio data, the energy levels of the audio data in one or more spectral bands, the signal-to-noise ratios of the audio data in one or more spectral bands, or other quantitative aspects. In other examples, the DSDD component 210 may implement a machine learning (ML) model, such as a classifier, configured to distinguish speech from background noise. The ML model may be implemented by techniques such as linear classifiers, support vector machines, and decision trees. In still other examples, the DSDD component 210 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in the audio data 202.

In some embodiments, once the DSDD component 210 detects speech in the audio data 202, the DSDD component 210 may determine if the speech is directed at the device 110/system(s) 120. In at least some embodiments, the DSDD component 210 may be configured to detect device-directed speech based on the speech including a particular word or phrase, for example, a wakeword(s). Different wakewords may correspond to a different digital/virtual assistant. An example wakeword/digital assistant name is "Alexa." In some embodiments, the DSDD component 210 may determine that the audio data 202 includes speech representing the wakeword(s) without first separately determining that the audio data 202 includes speech.

In some embodiments, the DSDD component 210 may detect the wakeword in the audio data 202 without performing linguistic analysis, textual analysis, or semantic analysis. Instead, the DSDD component 210 may analyze the audio data 202 to determine if specific characteristics of the audio data match preconfigured acoustic waveforms, audio signatures, or other data corresponding to a wakeword.

Thus, the DSDD component 210 may compare the audio data 202 to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech signals includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the DSDD component 210 may include one or more neural network architectures, such as a deep neural network (DNN) or a recurrent neural network (RNN) directly, without HMM being involved. Such an architecture may estimate the posteriors of wakewords with context data, either by stacking audio frames within a context window for DNN, or using RNN. Follow-on posterior threshold tuning or smoothing may be applied for determining whether the audio data 202 includes a wakeword. Other techniques for wakeword detection, such as those known in the art, may also be used.

In some embodiments, the DSDD component 210 may be configured to detect device-directed speech that does not include a keyword(s). In some cases, the system 100 may need more information from the user 5 to determine a response to the initial user input. For example, the user 5 may request the system to add an item to a list, but may not say what the item is. In such instances, the system 100 may cause the device 110 to output synthesized speech (or another form of prompt) soliciting the additional information from the user 5. In such situations, audio data captured by the device 110 after the prompt is outputted may be identified as device-directed speech by the DSDD component 210. In some embodiments, the system 100 may instruct the DSDD component 210 to identify the further audio data as device-directed speech (which may represent speech including the prompted-for information) without first determining if a keyword(s) was spoken. Thus, if the user 5 speaks the additional information in response to the prompt without first speaking the keyword, the additional speech may be captured for speech processing. The DSDD component 210 may then send the audio data or the embedding data corresponding to the audio data to the ASR component 240 for processing. Such situations may be referred to as dialog driven slot filling in which the user 5 needs to provide additional information in order for the system to output a response to the user 5 corresponding to the ongoing conversation (e.g., the dialog) between the system and the user 5. Such operations may be performed when the system 100 determines that additional information is needed from the user 5 in order to complete an operation of a pending command (e.g., processing related to a particular dialog is ongoing).

In some embodiments, the system 100 may include a dialog management component that may send the instruction to the DSDD component 210 to identify audio data received at a particular time (e.g., after the system 100 outputs the prompt, or after the system 100 outputs a system response to the previous user input in the on-going dialog) as device-directed speech. In other embodiments, the DSDD component 210 may receive dialog data, from the dialog management component, corresponding to the on-going dialog, using which the DSDD component 210 may determine that the received audio data is device-directed speech. For example, the DSDD component 210 may determine that the audio data includes device-directed speech based on a time elapsed between when the output of a system response to the previous user input in the on-going dialog and when the audio data is received at the device 110.

In some embodiments, after a dialog has concluded, the system 100 may determine that the user 5 is likely to say something directed to the device. When the DSDD component 210 detects device-directed speech (e.g., including a keyword(s)), the audio data corresponding to a first user input may be sent to the ASR component 240 for processing. The system 100 may output a system response responsive to the first user input. The system 100 may also determine it is likely that the user 5 will provide the system 100 with a second user input (e.g., a new command indicating the beginning of a new dialog) following output of the system response responsive to the first user input. In this case, the system 100 may cause the DSDD component 210 to identify the audio data (corresponding to the second user input), received after the system response is outputted, as device-directed speech, even though the audio data may not include a keyword(s).

In some embodiments, the DSDD component 210 may also perform other techniques to determine whether received audio data represents device directed speech. For example, the DSDD component 210 may use beamforming and/or other audio processing techniques to determine a voice's direction and/or originating distance relative to the device 110. An array of microphones (e.g., microphones 1120 shown in FIG. 11) of the device 110 may also be used to perform beamforming/other techniques to determine a direction and/or a location of a source (e.g., the user 5) of a sound relative to the device 110. Data from the array of microphones as well as other components may be used to track a sound's source as it moves around an environment of a device 110. The DSDD component 210 may consider other data such as, direction data (e.g., data regarding a direction from which speech is received/detected by the device 110), a beam index number, an angle data, or the like. In some embodiments, the DSDD component 210 may use the other data, indicating that a direction of a user's speech is toward a device 110 or away from a device 110, to determine whether the speech is device-directed or not.

In some embodiments, the DSDD component 210 may use other techniques such as computer vision techniques to process image data (e.g., captured by a camera 1118 of the device 110 shown in FIG. 11) to determine whether received audio data represents device directed speech. For example, the DSDD component 210 may process image data, captured approximately at the same time as the audio data is captured, to determine whether the user 5 was looking at the device 110 or not when speaking to determine whether speech was device-directed or not. As another example, the DSDD component 210 may process the image data to determine one or more gestures/movements made by the user 5 while speaking indicating the speech is device-directed (e.g., the user 5 points to the device 110, approaches the device 110, the user 5 walks away from the device 110). As another example, the DSDD component 210 may process the image data to determine if the user 5 is speaking to another user (e.g., the user 5 is looking towards another user).

In some embodiments, the DSDD component 210 may take some time to process the audio data 202 (experience some latency) to determine the speech indicator 212. While the DSDD component 210 is processing the audio data 202, the AEG component 220 may process the audio data 202 to determine embedding data 222. For illustration purposes, assume that the audio data 202 begins at a first time (T) and, at a second time (H) after the first time, the DSDD component 210 outputs the speech indicator 212 indicating that the audio data 202 includes device-directed speech. The AEG component 220 may be configured to generate the embedding data 222 for the audio data 202, such that the embedding data 222 represents information for the time that it takes the DSDD component 210 to determine the speech indicator 212. Thus, continuing with the example, the embedding data 222 may correspond to the audio data 202 for the duration of time between the first time and the second time (e.g., [T, T+H]).

In some embodiments, the length of the audio data 202 may correspond to the processing latency of the DSDD component 210. For example, if the DSDD component 210 requires a first duration of time to process the audio data 202, then the length of audio corresponding to the audio data 202 may be the first duration of time, and the embedding data 222 may represent information for the entirety of the audio data 202 (may represent speech for the entirety of the first duration of time).

The AEG component 220 may employ one or more neural networks to process audio data and generate embedding data. In some embodiments, the AEG component 220 may employ a recurrent architecture, such as a RNN model(s), where the embedding outputted by the AEG component 220 is updated every time step. The AEG component 220 may determine the length of audio data (the number of time steps) for which embedding data is retained. The AEG component 220 may determine the length based on the processing latency of the DSDD component 210, such that the length corresponds to the time it takes the DSDD component 210 to detect speech. The AEG component 220 may empirically determine the length based on training operations. In some embodiments, the length may be set manually.

In other embodiments, the AEG component 220 may employ a neural network (for example without a recurrent technique), such as a DNN model(s), where the AEG component 220 processes audio data of a fixed size window to generate embedding data corresponding to the fixed size window of audio data. In this case, the AEG component 220 may determine the size of the window based on the processing latency of the DSDD component 210, such that the window size is the amount of time it takes the DSDD component 210 to detect speech. The AEG component 220 may empirically determine the size of the window based on training operations. In some embodiments, the window size may be set manually.

The AEG component 220 may process the audio data 202 using the one or more neural networks, and may output the embedding data 222. The embedding data 222 may be one data vector or may be a set of multiple data vectors. The neural network(s) employed by the AEG component 220 may not include a softmax layer or other layers that process audio data to determine a prediction/probability. Instead, the embedding data 222 may be the output from an intermediate layer(s), and may be a relatively low-dimensional representation of the audio data 202 that contains all the information needed by the ASR component 240 to perform its speech transcription task. In some embodiments, the neural network(s) of the AEG component 220 and the models of the ASR component 240 may be trained together, as described below in relation to FIGS. 2A and 2B, so that the neural network(s) of the AEG component 220 generates embedding data that enables the ASR component 240 to perform its task.

The AEG component 220 may continuously run on the device 110, along with the DSDD component 210, such that the audio data 202 is inputted to the AEG component 220 at the same as time as it is inputted to the DSDD component 210. The AEG component 220 is configured to continuously output embedding data for audio data received at the device 110, regardless of whether speech is detected, so that if speech is detected, then the embedding data is ready to be sent to the ASR component 240 for processing. Moreover, the embedding data determined by the AEG component 220 contains information corresponding to when the speech begins (e.g., at a first time T) in the audio data, even though the DSDD component 210 may detect the speech after the speech begins in the audio data (e.g., at a second time T+H).

In some embodiments, the AEG component 220 and the DSDD component 210 may stop processing audio data that is received subsequent to detecting speech. For example, the AEG component 220 and the DSDD component 210 may not process the audio data 204 that is received subsequent to the audio data 202 when speech is detected in the audio data 202. Instead, the audio data 204 may be sent directly to the ASR component 240 for processing. The DSDD component 210 and the AEG component 220 may resume processing audio data received at the device 110 after the instant interaction between the device 110 and the user 5 ends. In some embodiments, the system(s) 120 or the device 110 may determine that the interaction has ended based on the device 110 not receiving any additional audio data for a period of time. In some embodiments, the system(s) 120 or the device 110 may determine that the interaction has ended based on a predefined amount of time being elapsed since the DSDD component 210 detected speech in the audio data 202. In some embodiments, the system(s) 120 or the device 110 may determine that the interaction has ended after an action responsive to the spoken input is determined or the action has been performed/outputted by the device 110 or another device. An action responsive to the spoken input may be determined as described below in relation to FIGS. 6 and 7.

The system 100 may perform start-point detection and end-point detection to determine when speech begins and when speech ends. In some embodiments, the DSDD component 210 may include a voice activity detection component that may be configured to detect patterns in the received audio data to identify speech from a person, and may also be configured to determine when speech started and when speech ended in the received audio data. In some embodiments, the DSDD component 210 may be configured to determine when speech started in the received audio data, and the ASR component 240 may be configured to determine when speech ended in the received audio data.

The system 100 may generate indicators for the start-point and the end-point, which may be used by components of the system 100 for processing the received audio data. In some example embodiments, when the speech ends in the received audio data, the ASR component 240 may stop processing subsequently received audio data, and the DSDD component 210 and the AEG component 220 may start processing the subsequently received audio data. As such, in some embodiments, either the DSDD component 210 and the AEG component 220 are active, or the ASR component 240 is active at any given time. In other words, the DSDD component 210 and the AEG component 220 may be operational and processing audio data received at the device 110 until the start-point indicator, at which time the ASR component 240 becomes operational (and the DSDD component 210 and the AEG component 220 are inactive). Once the end-point is detected, the ASR component 240 becomes inactive, and the DSDD component 210 and the AEG component 220 become active. In other embodiments, the DSDD component 210 and the AEG component 220 may be active (and processing received audio data) while the ASR component 240 is operational and processing audio data.

The embedding data 222 may be a low dimensional vector representation mapped from the audio data 202. In some embodiments, the embedding data 222 may be a single vector containing information for the entirety of the audio data 202. In some embodiments, the embedding data 222 may be a set of multiple vectors, where each vector may correspond to a portion of the audio data 202, and the set of vectors may correspond to the entirety of the audio data 202. The embedding data 222 may be stored for later use/processing.

In some embodiments, the AEG component 220 may delete/discard embedding data corresponding to audio data in which speech is not detected. In some embodiments, the AEG component 220 may replace any stored embedding data with current embedding data determined by the AEG component 220. In some embodiments, the AEG component 220 may temporarily store embedding data corresponding to various audio data in a buffer. In some embodiments, the AEG component 220 may store embedding data in a rolling buffer, where previously stored embedding data (e.g., the "first-in" embedding data) may be deleted as new embedding data is generated and stored. For example, the AEG component 220 may store embedding data corresponding to audio data received prior to the audio data 202. This embedding data may be stored in addition to the embedding data 222 corresponding to the audio data 202. If speech is detected in the audio data 202, then the AEG component 220 may determine to send the embedding data 222 and the embedding data for the audio data received prior to the audio data 202.

The AEG component 220 may empirically learn the amount of embedding data/the amount of audio data needed by the ASR component 240 to efficiently process an incoming spoken input. In some embodiments, this amount of embedding data/audio data may correspond to how long a user generally takes to say the wakeword(s). In some embodiments, this amount of embedding data/audio data may correspond to how long it takes the DSDD component 210 to detect speech.

In some embodiments, the AEG component 220 may be configured/trained based on a device type. Different device types may have different processing capabilities, which may affect the processing latency of the DSDD component 210, and the neural network(s) of the AEG component 220 may learn how much embedding data/audio data is needed based on the particular device type's processing latency. For example, a first instance of the AEG component 220 for a first device type may determine embedding data for a first length of audio data, while a second instance of the AEG component 220 for a second device type may determine embedding data for a second length of audio data that is different than the first length of audio data. In a further example, the first instance of the AEG component 220 may store a first amount of embedding data to be sent to the ASR component 240 when speech is detected, while the second instance of the AEG component 220 may store a second amount of embedding data that is different than the first amount.

In some embodiments, the AEG component 220 may be configured/trained based on a particular user or a particular group/type of users. Different users or different group of users (e.g., users of a particular geographic region) may speak a wakeword(s) in different ways, for example, how long it takes to say the wakeword(s) may vary for different users/group of users. The AEG component 220 may be configured to take into account how long a particular user or particular group of users may take to say the wakeword(s). Moreover, the AEG component 220 may be configured to take into account how long a user may take to say different wakewords. For such configurations, the AEG component 220 may use audio data received during past interactions between a particular user and the system(s) 120. Based on a particular user's past interactions, the AEG component 220 may determine an amount of embedding data/audio data needed. For example, a first instance of AEG component 220 on a first device 110a associated with a first user 5a may determine a first amount of embedding data, while a second instance of the AEG component 220 on a second device 110b associated with a second user 5b may determine a second amount of embedding data that is different than the first amount. In some embodiments, a first device 110a may include an AEG component 220 that is configured using data corresponding to multiple different users (configured for a generic user), and the AEG component 220 may then be fine-tuned using data corresponding to the particular user 5a of the first device 110a. In some embodiments, the AEG component 220 may determine the amount of embedding data/audio data needed based on recognizing the user 5 that provides the spoken input. As described below in relation to FIGS. 6 and 7, a user recognition component 695 may identify the user 5 whose speech is represented in the audio data 202.

The decision block 230 may perform certain steps based on the speech indicator 212. If the speech is detected in the audio data 202, as indicated by the speech indicator 212, then the embedding data 222 is sent to the ASR component 240. In some embodiments, the decision block 230 may send the embedding data 222 to the ASR component 240. In other embodiments, the decision block 230 may send an instruction to the AEG component 220 to send the embedding data 222 to the ASR component 240 for processing. If the audio data 202 includes device-directed speech, then any subsequently received audio data, for example, at least the audio data 204 may be sent directly, by the device 110, to the ASR component 240 for processing (i.e., sent to the ASR component 240 without first being input to the DDSD component 210 and the AEG component 220). The audio data 204 (and some other audio data) may be received immediately after the audio data 202, and may be considered as representing the same spoken input from the user 5.

If no speech is detected in the audio data 202, as indicated by the speech indicator 212, then the system 100 may process subsequently received audio data, for example, the audio data 206. In this case, the audio data 206 may be processed by the DSDD component 210 to determine whether the audio data 206 includes device-directed speech as described above, and the AEG component 220, in parallel to the DSDD component 210 processing, may process the audio data 206 to determine embedding data corresponding to the audio data 206 as described above. The audio data 206 may be received immediately after the audio data 202, or may be received after some time after the audio data 202 is received. The audio data 206 may not be considered as part of the same input as the audio data 202.

The decision block 230 may determine if speech is detected in the audio data 202 based on a Boolean value of the speech indicator 212, for example, the speech indicator 212 being "yes" (or "1" or "true") versus being "no" (or "0" or "false"). In some embodiments, the decision block 230 may determine if speech is detected in the audio data 202 based on a numerical value of the speech indicator 212 satisfying a condition (e.g., exceeding a threshold score/probability/confidence).

The ASR component 240 transcribes the audio data 202 and the subsequently received audio data 204 into ASR output data 250. In some embodiments, the ASR component 240 includes one or more recurrent neural network transducer (RNN-T) models. The RNN-T models are a form of sequence-to-sequence models that do not employ attention mechanisms. Unlike most sequence-to-sequence models, which typically need to process the entire audio sequence (such as audio for an entire spoken input) to produce an output (the words spoken by the user), the RNN-T model continuously processes input audio data and outputs tokens corresponding to words/sub-words represented in the speech. As such, the RNN-T model outputs tokens asynchronously. The RNN-T model implements a feedback loop that feeds tokens predicted by the model back into the model to predict the next token. In some embodiments, the ASR component 240 may additionally or alternatively include other types of ML models that may be capable of outputting tokens asynchronously.

The ASR component 240 is capable of processing embedding data corresponding to audio data, and also capable of processing the audio data directly. When speech is detected in the audio data 202, the embedding data 222 is provided to the ASR component 240. Traditionally, once speech is detected in audio data, the system would retrieve audio data (for a particular length of time) stored in a buffer and send the retrieved audio data to the ASR component for processing. Embodiments of the present disclosure provide the embedding data 222 for at least the audio data 202 to help reduce or eliminate any ASR processing latency that may be caused by the latency in the DSDD component 210 detecting speech (and having to then pull audio data from a buffer that has not yet been converted to embedding data). As such, the ASR component 240 being able to process embedding data is beneficial. In some cases, this benefit is realized due to the ASR component 240 employing a ML model(s) that outputs tokens asynchronously, such as an RNN-T model(s).

The ASR component 240 may process the embedding data 222 (when speech is detected in the audio data 202) to determine one or more tokens corresponding to the words/subwords represented in the speech of the audio data 202. The ASR component 240 may process the audio data 204 and any other audio data received subsequent to the audio data 202 that is part of the same spoken input, and may determine one or more tokens corresponding to the words/subwords represented in the speech of the audio data 204 and any other audio data subsequently received.

In some embodiments, the ASR component 240 may process the embedding data 222 using different layers of the ML model(s) than when processing the audio data 204. For example, the ASR component 240, in processing the embedding data 222, may use intermediate layers and final layers of the ML model(s) and skip the initial/beginning layers since the data is in embedding form. As a further example, the ASR component 240 may process the audio data 204 using all the layers of the ML model(s). FIG. 2C conceptually illustrates such processing by the ASR component 240. As shown, the ASR component 240 may process the embedding data 222 starting at a layer(s) 282, which may be an intermediate layer of a ML model, and continue processing using other layer(s) 284 of the ML model to generate an output 286 (e.g., token data corresponding to one or more characters/letters). In some embodiments, the output 286 may be fed back into the layer(s) 280 or 282 to be used for processing the next time step/input. As shown, the ASR component 240 may process the audio data 204 starting at a layer(s) 280, which may be an initial/first layer of the ML model and may be configured to determine embedding data for the audio data 204. In some embodiments, the ML model of the ASR component 240 may be a RNN-T model. In other embodiments, the ML model may be other types of neural network (e.g., DNN, CNN, RNN, etc.) or other types of ML models.

In some embodiments, the ASR component 240 may use a first ML model to process the embedding data 222, and may use a different second ML model to process the audio data 204. For example, the ASR component 240 may use a neural network(s), such as an RNN-T model(s), to process the embedding data 222, and the ASR component 240 may use one or more acoustic models and language models to process the audio data 204. Details on the acoustic models and language models are provided below in relation to FIG. 6.

The ASR component 240 may output the ASR output data 250. The ASR output data 250 may correspond to the audio data 202 and the audio data 204 (and any other subsequently received audio data that is part of the same spoken input), and may represent one or more words spoken by the user 5. The ASR output data 250 may include one or more ASR hypotheses. An ASR hypothesis may be configured as a textual interpretation of the speech, or may be configured in another manner, such as one or more tokens. Each ASR hypothesis may represent a different likely interpretation of the speech in the audio data. Each ASR hypothesis may be associated with a score representing a confidence of ASR processing performed to determine the ASR hypothesis with which the score is associated.

Figure 2B:
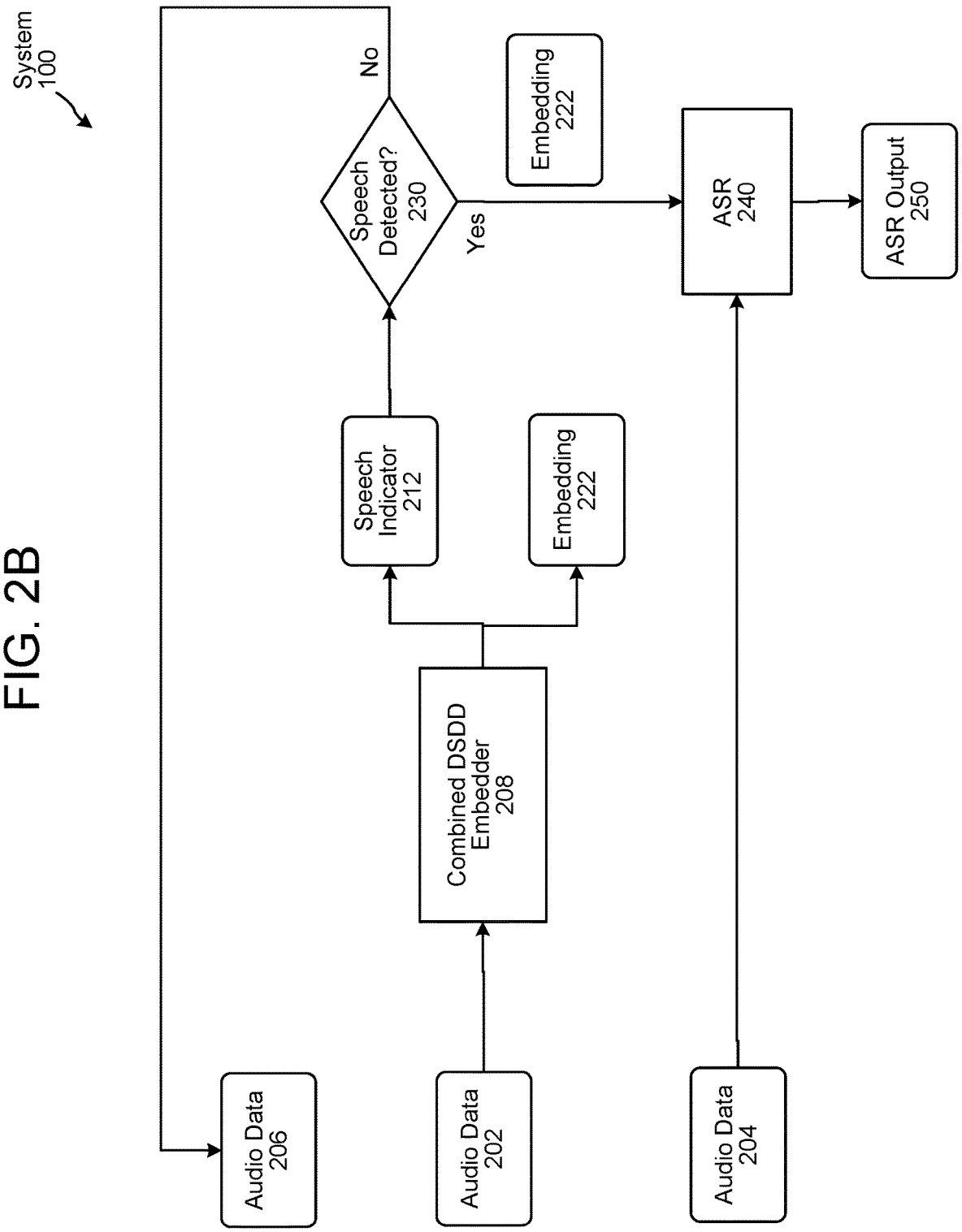

Referring to FIG. 2B, in example embodiments, the system 100 may include a combined DSDD embedder component 208, which may be configured to perform the functionalities of the DSDD component 210 and the AEG component 220 described herein. The combined DSDD embedder component 208 may be a ML model(s) configured for multi-task processing (such as detecting device-directed speech and generating embedding data using audio data) and may have two output layers. One of the output layers may correspond to the task of detecting device-directed speech and may output the speech indicator 212, while the other output layer may correspond to the task of generating embedding data and may output the embedding data 222. The speech indicator 212 may be processed by the decision block 230 and the audio data 202 may be processed by the ASR component 240 of FIG. 2B, in a similar manner as described above in relation to FIG. 2A.

Figure 6:
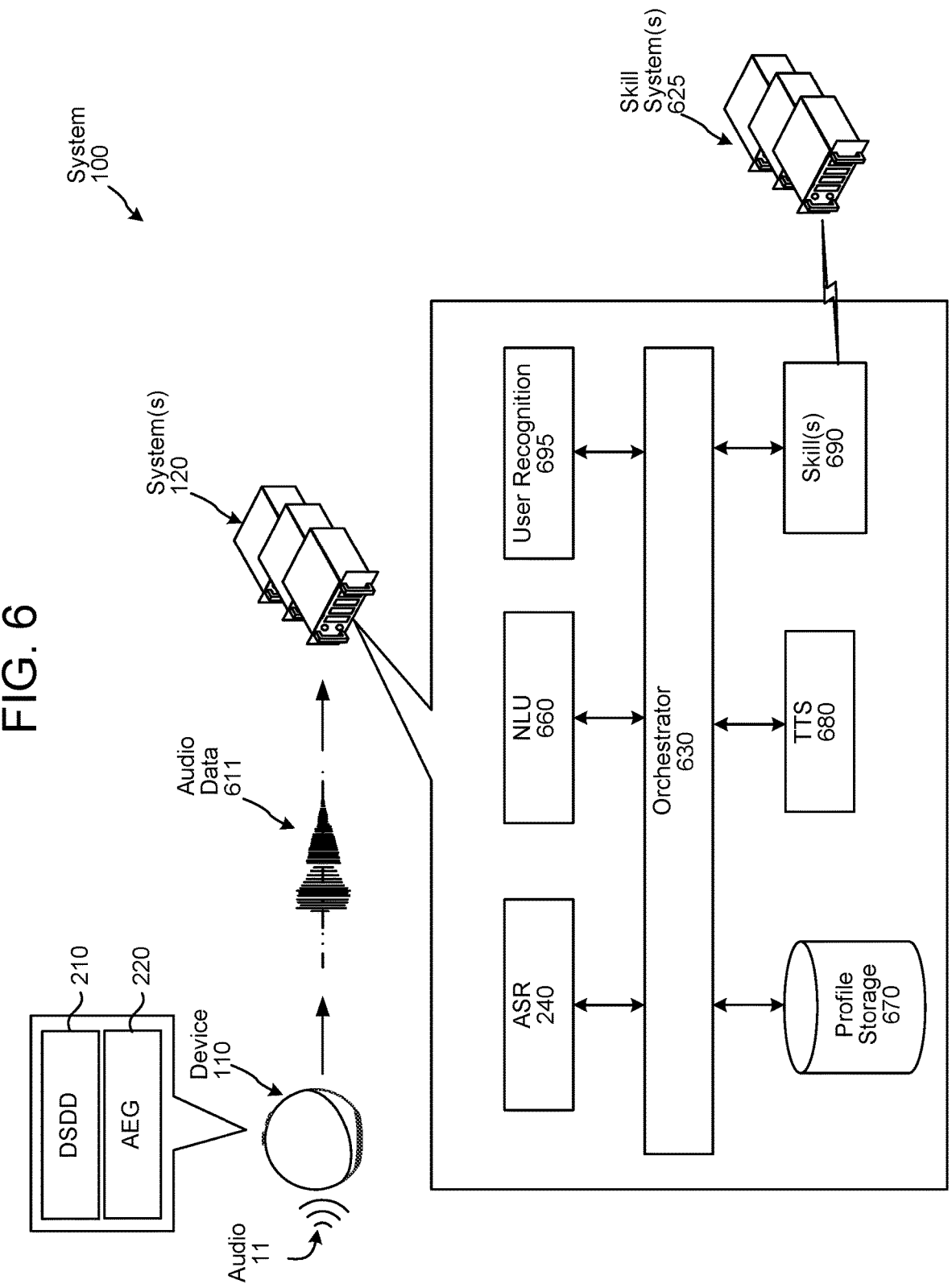
FIG. 6 is a conceptual diagram of components of a system, according to embodiments of the present disclosure.
Figure 7:
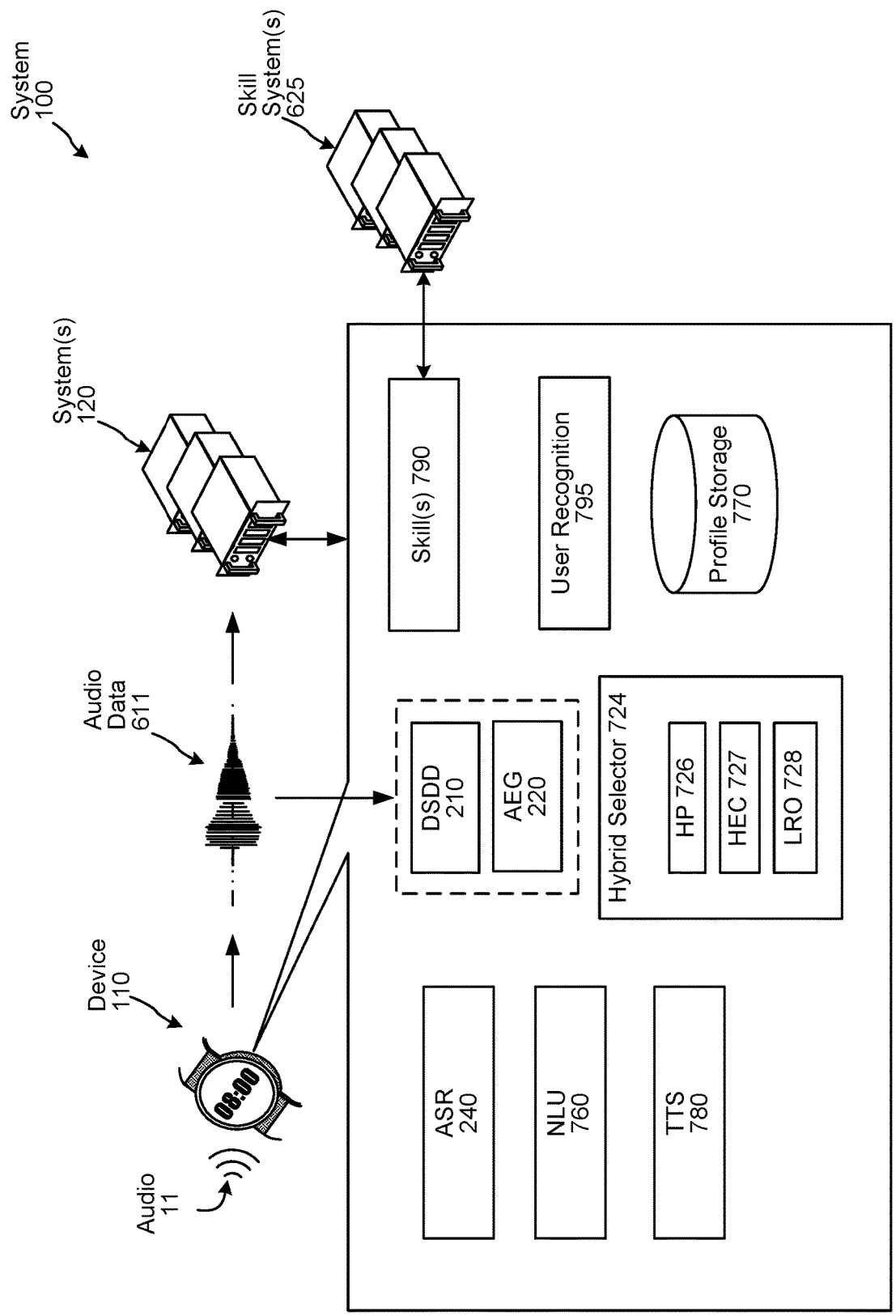
FIG. 7 is a conceptual diagram illustrating components that may be included in a device, according to embodiments of the present disclosure.

In some embodiments, the embedding data 222 for the audio data 202 may be provided by the device 110 to the ASR component 240 or other components shown in FIGS. 6 and 7 for processing. In some embodiments, the audio data 202 may also be provided by the device 110 to the ASR component 240 or other components shown in FIGS. 6 and 7 for processing. Some components may use high-resolution audio data to perform its processing, rather than the compressed version of the audio data (such as the embedding data 222). For example, one component may be configured to verify/confirm detection of the device-directed speech, and may use the audio data 202 (instead of the embedding data 222 for the audio data 202) to perform such verification/confirmation.

Figure 3:
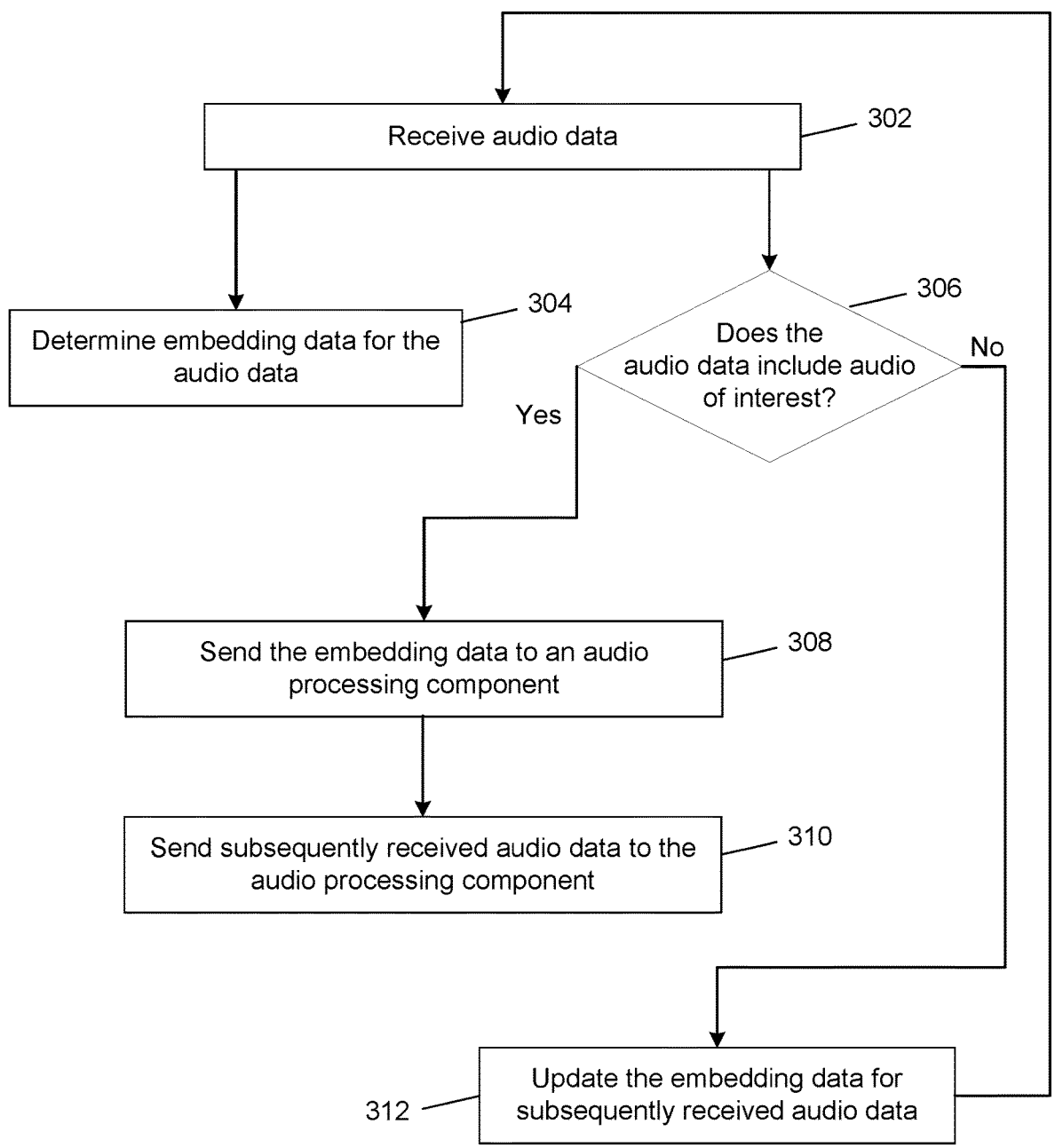
FIG. 3 is a flowchart illustrating a process that the system may perform to process audio data, according to embodiments of the present disclosure.

Although the above description relates to the system 100 detecting device-directed speech and sending embedding data 222 corresponding to received audio data 206 to the ASR component 240 to perform low-latency or zero-latency processing, similar techniques may be used to perform other types of low-latency or zero-latency audio processing. For example, the system 100 may include a detection component configured to detect whether the received audio includes audio of interest, and this detection component may take some time to make this determination. In the meantime, the AEG component 220 may generate embedding data for the received audio data. After the detection component determines that the audio data includes audio of interest, the embedding data from the AEG component 220 may be sent to an audio processing component, and subsequently received audio data may be sent directly to the audio processing component, if it is determined to be part of the same audio of interest. FIG. 3 is a flowchart illustrating an example process that the system 100 may perform to process audio data, according to embodiments of the present disclosure. At a step 302, the device 110 may receive audio data (e.g., first audio data). At a step 304, the AEG component 220 may determine embedding data for the audio data. At a step 306, a component at the device 110 (e.g., the DSDD component 210 or another component configured to detect events of interest) may determine whether the audio data includes audio of interest (e.g., device-directed speech).

If the audio data includes audio of interest, then at a step 308, the AEG component 220 may send the embedding data to an audio processing component (e.g., the ASR component 240 or another component configured to perform other type of processing) for processing. At a step 310, the device 110 may send subsequently received audio data to the audio processing component for processing.

If the audio data does not include audio of interest (as determined at decision block 306), then at a step 312 the AEG component 220 may update the embedding data for subsequently received audio data, by returning to the step 302, where additional audio data (e.g., second audio data) may be received and processed according to the steps shown in FIG. 3.

In some embodiments, one or more of the steps shown in FIG. 3 may be performed at the device 110 by the DSDD component 210 and the AEG component 220, or the combined DSDD embedder component 208.

Figure 4A:
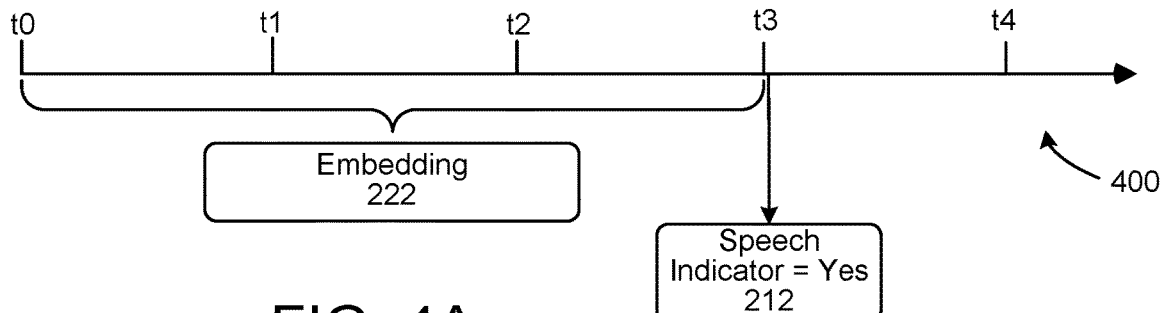
FIGS. 4A, 4B and 4C conceptually illustrate how the system may generate embedding vectors for incoming audio data, according to embodiments of the present disclosure.
Figure 4B:
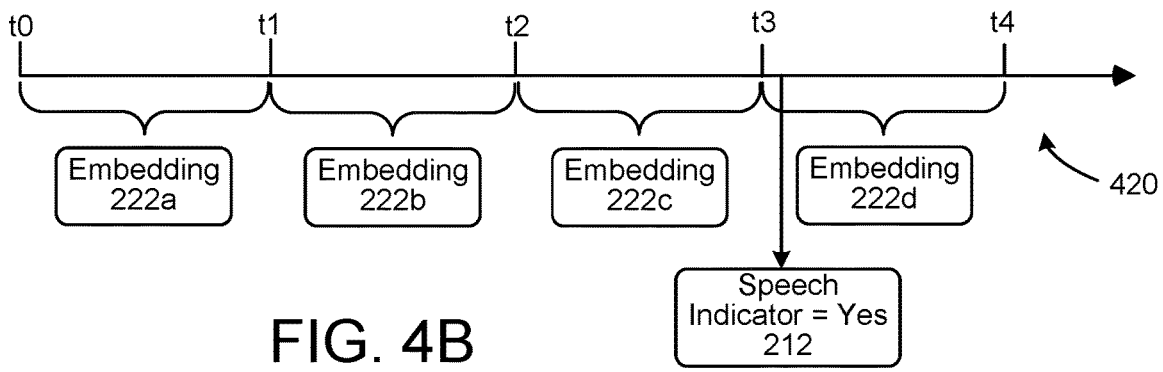
Figure 4C:
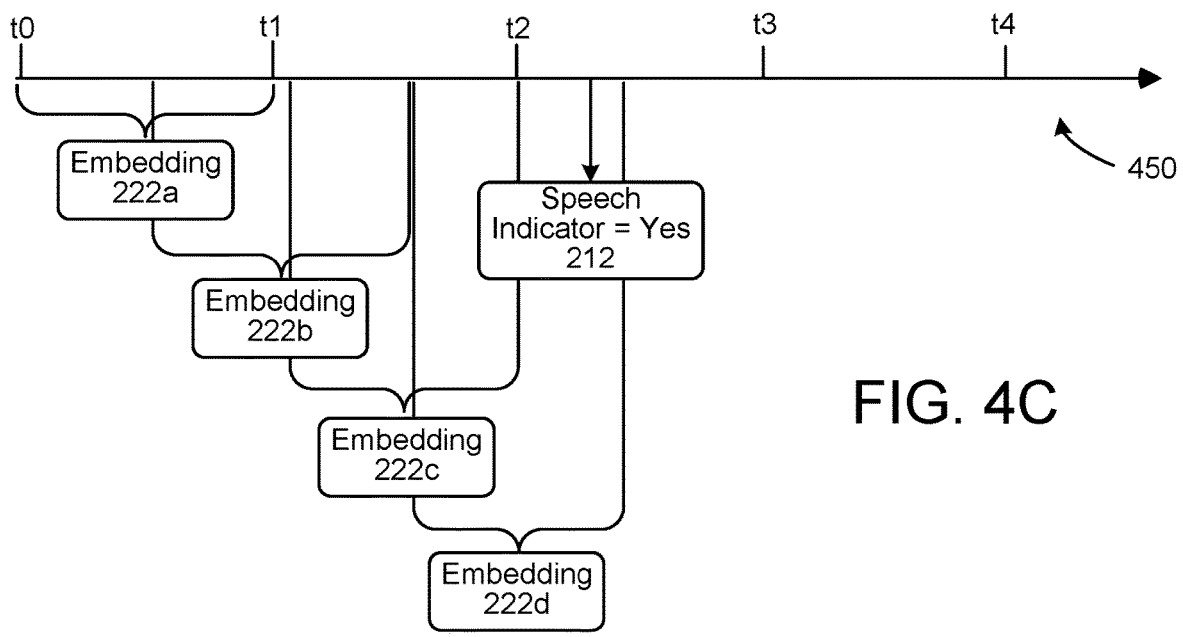

FIGS. 4A, 4B and 4C conceptually illustrate embedding data generated by the AEG component 220, according to embodiments of the present disclosure. Referring to FIG. 4A, assume that received audio data aligns with the illustrated time line 400 beginning at time t0. In some embodiments, the AEG component 220 may generate embedding data corresponding to multiple durations of time. For example, the embedding data 222, as illustrated in FIG. 4A, may correspond to audio data received during [t0, t3]. At approximately time t3, the DSDD component 210 may determine that the audio data represents device-directed speech as indicated by the speech indicator="yes" 212, and the embedding data 222 may be sent to the ASR component 240 for processing. In some embodiments, the AEG component 220 may determine that embedding data for a time duration [t0, t3] is needed by the ASR component 240 to perform low-latency or zero-latency processing.

In some embodiments, the RNN model of the AEG component 220 may be configured to determine the embedding data 222 on a rolling basis, such that embedding data for a prior time duration/interval may be replaced or updated with embedding data for a current time duration/interval. For example, referring to FIG. 4A, the AEG component 220 may receive audio data for time duration [t3, t4](not shown), then the embedding data 222 may correspond to audio data for the time duration [t1, t4]. In this case, if the device-directed speech is detected at time t4, then the embedding data 222 corresponding to [t1, t4] may be sent to the ASR component 240. Given the nature of a RNN model, the embedding data 222 may inherently or intrinsically be updated based on the amount of embedding data the AEG component 220 determines that the ASR component 240 needs to perform low-latency or zero-latency processing.

Referring to FIG. 4B assume that received audio data aligns with the illustrated time line 420 beginning at time t0. In some embodiments, the AEG component 220 may generate embedding data for received audio data for non-overlapping durations of time. For example, as shown, the AEG component 220 may generate embedding data 222a corresponding to audio data for the duration [t0, t1], embedding data 222b corresponding to audio data for the duration [t1, t2], embedding data 222c corresponding to audio data for the duration [t2, t3], and embedding data 222d corresponding to audio data for the duration [t3, t4]. In some embodiments, the AEG component 220 may delete/discard the embedding data 222a after the embedding data 222b is determined, and may delete/discard the embedding data 222b after the embedding data 222c is determined. The AEG component 220 may delete/discard the embedding data, in this manner, based on the length of the respective audio data corresponding to the time it takes the DSDD component 210 to detect device-directed speech in the audio data. In other embodiments, the AEG component 220 may store the embedding data 222a, 222b, 222c in a buffer, so that it is available for the ASR component 240 if needed.

The DSDD component 210 may detect device-directed speech at approximately time t3, as shown by the speech indicator 212 set to "yes." Based on the DSDD component 210 detecting speech at time t3, the AEG component 220 may send the embedding data 222c to the ASR component 240, based on the DSDD component 210 likely detecting speech within audio data received during time [t2, t3]. In some cases, the AEG component 220 may also send embedding data 222b depending on the processing latency of the DSDD component 210.

Referring to FIG. 4C assume that received audio data aligns with the illustrated time line 450 beginning at time t0. In this case, the AEG component 220 may generate embedding data for received audio data for overlapping durations of time. For example, as shown, the AEG component 220 may generate embedding data 222a corresponding to audio data for the duration [t0, t1], embedding data 222b corresponding to audio data for the duration [t1/2, t2], embedding data 222c corresponding to audio data for the duration [t1, t2], etc. The AEG component 220 may determine a different amount of overlap between the durations of time. The DSDD component 210 may detect speech after time t2, as shown by the speech indicator 212 set to "yes." Based on the DSDD component 210 detecting speech after time t2, the AEG component 220 may send the embedding data 222c to the ASR component 240. In some cases, the AEG component 220 may also send the embedding data 222b and/or embedding data 222d to the ASR component 220 for processing.

Although FIGS. 4A-4C show how embedding data 222 may be generated and provided to the ASR component 240 when the speech indicator 212 is "yes," it should be understood that the embedding data 222 may be sent to (alternatively or additionally) another audio processing component when another type of event is detected.

Figure 5A:
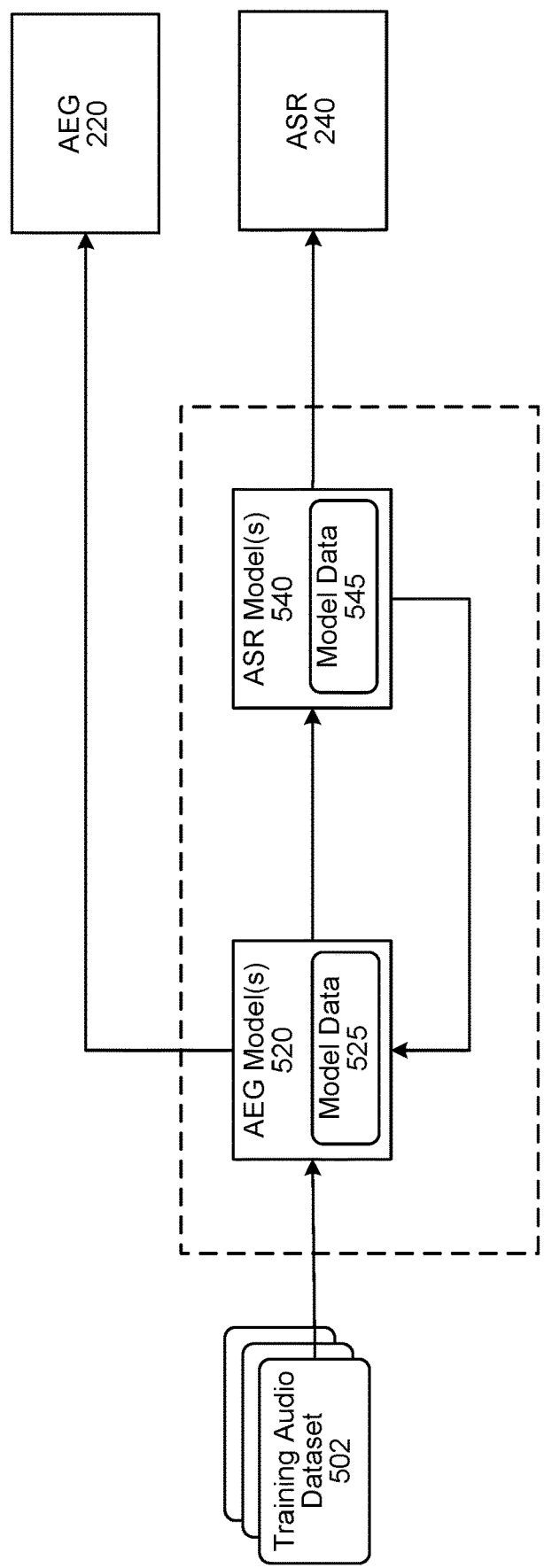
FIGS. 5A and 5B are conceptual diagrams showing how the system may be trained, according to embodiments of the present disclosure.
Figure 5B:
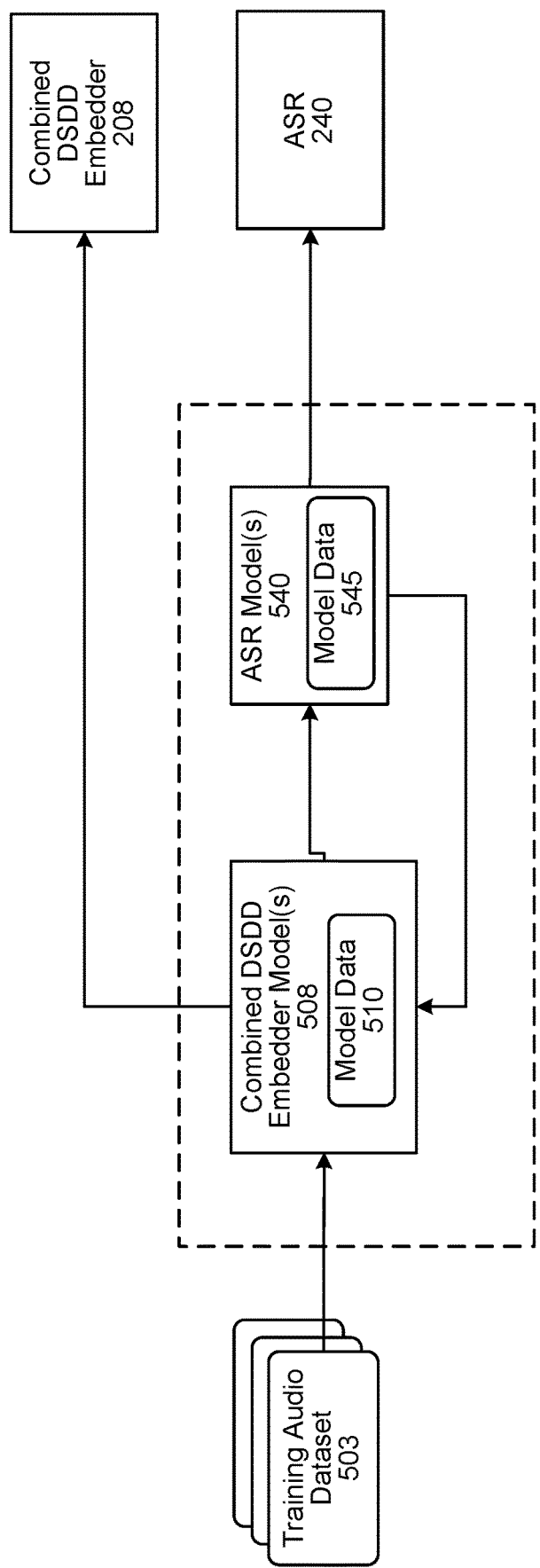

FIGS. 5A and 5B are conceptual diagrams showing how the system may be trained, according to embodiments of the present disclosure. In at least some embodiments, the models for the AEG component 220/the combined DSDD embedder component and the ASR component 240 may be jointly trained.

Referring to FIG. 5A, it is now described how the AEG component 220 and the ASR component 240 may be trained. An AEG model(s) 520 may process training audio data 502, and the output of the AEG model(s) may be processed by an ASR model(s) 540 to generate model data 545. During training the model updates to the ASR model(s) 540 are back propagated to the AEG model(s) 520. In other words, the AEG model(s) 520 is being trained as part of the ASR model(s) 540. The model data 525 includes weights, parameters and other data learned by the AEG model(s) 520 during training operations. The model data 545 includes weights, parameters and other data learned by the ASR model(s) 540 during training operations. The AEG model(s) 520 may be trained to generate embedding data for audio data. During training, the AEG model(s) 520 may also learn how much embedding data (i.e. what duration of audio data is to be processed) is to be generated/stored so that the ASR model(s) 540 can perform its task efficiently. The ASR model(s) 540 may be trained to transcribe speech from audio data. In some embodiments, the AEG model(s) 520 and the ASR model(s) 540 may be one or more neural networks, for example, one or more of LSTMS, DNNs, RNNs, RNN-Ts, or other neural networks.

The training audio dataset 502 may include multiple different audio data. Some of the audio data in the training audio dataset 502 may include speech, and the other audio data may not include speech. The training audio dataset 502 may include audio data received by one or more devices 110 and the system(s) 120 during past interactions with multiple different users. In some embodiments, the audio data, that contains speech, may be labeled with tokens corresponding to the speech (on a word and/or subword level). Additionally, the audio data, containing speech, may be labeled to indicate at what time the DSDD component 210 detected the speech. Additionally or alternatively, the audio data, containing speech, may be labeled to indicate a duration of time corresponding to a wakeword(s).

Once the models 520 and 540 are trained, the AEG component 220 and the ASR component 240 may be determined. Using the model data 525 learned during training operations, the AEG component 220 may be determined. Using the model data 545 learned during training operations, the ASR component 240 may be determined.

Referring to FIG. 5B, it is now described how the combined DSDD embedder 208 and the ASR component 240 may be trained. A combined DSDD embedder model(s) 508 may process a training audio dataset 503, and the output of the combined DSDD embedder model(s) 508 may be processed by an ASR model(s) 540 to generate model data 545. During training the model updates to the ASR model(s) 540 are back propagated to the combined DSDD embedder model(s) 508. The model data 510 includes weights, parameters and other data learned by the combined DSDD embedder model(s) 508 during training operations. The model data

545 includes weights, parameters and other data learned by the ASR model(s) 540 during training operations.

The combined DSDD embedder model(s) 508 may be trained in a multi-task fashion to detect speech in audio data and to generate embedding data for the audio data. During training, the model(s) 508 may also learn how much embedding data (i.e. what duration of audio data is to be processed) is to be generated/stored so that the ASR model(s) 540 can performs its task efficiently. The model(s) 508 may be one or more neural networks, for example, one or more of LSTMs, DNNs, RNNs, etc.

The training audio dataset 503 may include multiple different audio data. Some of the audio data may include speech, and other of the audio data may not include speech. Additionally, some of the audio data that contains speech may include device-directed speech (e.g., contain a wakeword(s)), while other of the audio data may include speech that is not device-directed. In cases where the audio data includes device-directed speech, model data of both of the combined DSDD embedder model(s) 508 and the ASR model(s) 540 may be updated. In cases where the audio data includes speech that is not device-directed, only model data of the combined DSDD embedder model(s) 508 may be updated.

Once the models 508 and 540 are trained, the combined DSDD embedder component 208 and the ASR component 240 may be determined. Using the model data 510 learned during training operations, the combined DSDD embedder component 208 may be determined. Using the model data 545 learned during training operations, the ASR component 240 may be determined.

The system 100 may operate using various components as illustrated in FIG. 6. The various components may be located on a same or different physical devices. Communication between various components may occur directly or across a network(s) 199.

As shown in FIG. 6, the device 110 may include the DSDD component 210 and the AEG component 220 (or the combined DSDD embedder component 208), whose functionalities are described above.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other different components.

The system 120 may include an orchestrator component 630 configured to, among other things, coordinate data transmissions between components of the system 120. The orchestrator component 630 may receive the audio data 611 from the device 110, and send the audio data 611 to an ASR component 240.

The ASR component 240 transcribes the audio data 611 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 611. Each ASR hypothesis may be associated with a score representing a confidence of ASR processing performed to determine the ASR hypothesis with which the score is associated.

In some embodiments, the ASR component 240 may employ one or more RNN-T models to process audio data, as described above in relation to FIG. 2A. In other embodiments, the ASR component 240 may employ acoustic models and language models to transcribe speech in the audio data. The ASR component 240 may interpret the speech in the audio data 611 based on a similarity between the audio data 611 and pre-established language models. For example, the ASR component 240 may compare the audio data 611 with models for sounds (e.g., subword units, such as phonemes, etc.) and sequences of sounds to identify words that match the sequence of sounds of the speech represented in the audio data 611.

The orchestrator component 630 may send the ASR output data 250 (described in connection with FIGS. 2A and 2B), depending on the type of natural language user input received, to a NLU component 660. The NLU component 660 processes the ASR output data 250 to determine one or more NLU hypotheses embodied in NLU output data. The NLU component 660 may perform intent classification (IC) processing on the ASR output data to determine an intent of the natural language user input. An intent corresponds to an action to be performed that is responsive to the natural language user input. To perform IC processing, the NLU component 660 may communicate with a database of words linked to intents. For example, a music intent database may link words and phrases such as "quiet," "volume off," and "mute" to a <Mute> intent. The NLU component 660 identifies potential intents by comparing words and phrases in ASR output data or text data to the words and phrases in an intents database. In at least some embodiments, the NLU component 660 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 660 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 660 may be linked to one or more grammar frameworks with "slots" to be filled. Each slot of a grammar framework corresponds to a portion of ASR output data or text data that the NLU component 660 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 660 may perform NER processing to identify words in ASR output data or text data as subject, object, verb, preposition, etc. based on grammar rules and/or models. Then, the NLU component 660 may perform IC processing that involves using the identified verb to identify an intent. Thereafter, the NLU component 660 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 660 may generate NLU output data including one or more NLU hypotheses, with each NLU hypothesis including the intent and slot(s) determined from IC processing and NER processing of the ASR output data or text data. In at least some embodiments, the NLU component 660 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 240 and the NLU component 660). In at least some embodiments, the system 120 may implement a spoken language understanding (SLU) component configured to process audio data 611 to determine NLU output data.

The SLU component may be equivalent to a combination of the ASR component 240 and the NLU component 660. Yet, the SLU component may process audio data 611 and directly determine the NLU output data, without an intermediate step of generating ASR output data. As such, the SLU component may take audio data 611 representing speech and attempt to make a semantic interpretation of the speech. That is, the SLU component may determine a meaning associated with the speech and then implement that meaning. For example, the SLU component may interpret audio data 611 representing speech from the user 5 in order to derive a desired action. The SLU component may output a most likely NLU hypothesis, or multiple NLU hypotheses associated with respective confidence or other scores (such as probability scores, etc.).

The NLU component 660 may send the NLU output data to the orchestrator component 630. The orchestrator component 630 may send the top-scoring NLU hypothesis (in the NLU output data) to a skill associated with the NLU hypothesis.

The system 120 may include one or more skill components 690 and/or may communicate with one or more skill systems 625 via one or more skill components 690. As used herein, a "skill" may refer to a skill component 690, a skill system 625, or a combination of a skill component 690 and a skill system 625. A skill may be configured to execute with respect to NLU output data. For example, for an NLU hypothesis including a <GetWeather> intent, the system 120 (and more particularly the orchestrator component 630) may invoke a weather skill to determine and output weather information for a geographic location represented in a user profile or corresponding to a location of the device 110 that captured the corresponding natural language user input. For further example, for an NLU hypothesis including a <BookRide> intent, the system 120 (and more particularly the orchestrator component 630) may invoke a taxi skill to book a requested ride. In another example, for an NLU hypothesis including a <BuyPizza> intent, the system 120 (and more particularly the orchestrator component 630) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 680 that determine audio data (e.g., synthesized speech) from text data using one or more different methods. Text data input to the TTS component 680 may come from a skill, the orchestrator component 630, or another component of the system 120.

In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to determine audio data including an artificial speech waveform. Parametric synthesis uses a computerized voice generator, sometimes called a vocoder.

The system 120 may include a user recognition component 695. The user recognition component 695 may recognize one or more users using various data. The user recognition component 695 may take as input the audio data 611. The user recognition component 695 may perform user recognition by comparing speech characteristics, in the audio data 611, to stored speech characteristics of users (e.g., stored speech characteristics associated with user profile identifiers associated with the device 110 that determined the audio data 611). The user recognition component 695 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 611 or otherwise captured a user input). The user recognition component 695 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 611 or otherwise captured a user input). The user recognition component 695 may perform other or additional user recognition processes, including those known in the art. For a particular user input, the user recognition component 695 may perform processing with respect to stored data of users associated with the device 110 that captured the user input.

The user recognition component 695 determines whether a user input originated from a particular user. For example, the user recognition component 695 may determine a first value representing a likelihood that a user input originated from a first user, a second value representing a likelihood that user input originated from a second user, etc. The user recognition component 695 may also determine an overall confidence regarding the accuracy of user recognition processing.

The user recognition component 695 may output a single user profile identifier corresponding to the most likely user that originated the user input. Alternatively, the user recognition component 695 may output multiple user profile identifiers (e.g., in the form of an N-best list) with respective values representing likelihoods of respective users originating the user input. The output of the user recognition component 695 may be used to inform NLU processing, processing performed by a skill, as well as processing performed by other components of the system 120 and/or other systems.

The system 120 may include profile storage 670. The profile storage 670 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 670 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 670 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 670 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The foregoing describes illustrative components and processing of the system 120. In at least some embodiments, the device 110 may be configured to include some or all of the components, and perform some or all of the processing, of the system 120 described above. FIG. 7 illustrates such a configured device 110.

In at least some embodiments, the system 120 may receive the audio data 611 from the device 110, to recognize speech corresponding to a spoken input in the received audio data 611, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 780) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 6, the device 110 may include a wakeword detection component configured to compare the audio data 611 to stored models used to detect a wakeword (e.g., "Alexa") that indicates to the device 110 that the audio data 611 is to be processed for determining NLU output data (e.g., slot data that corresponds to a named entity, label data, and/or intent data, etc.). In at least some embodiments, a hybrid selector 724, of the device 110, may send the audio data 611 to the wakeword detection component. If the wakeword detection component detects a wakeword in the audio data 611, the wakeword detection component may send an indication of such detection to the hybrid selector 724. In response to receiving the indication, the hybrid selector 724 may send the audio data 611 to the system 120 and/or the ASR component 750. The wakeword detection component may also send an indication, to the hybrid selector 724, representing a wakeword was not detected. In response to receiving such an indication, the hybrid selector 724 may refrain from sending the audio data 611 to the system 120, and may prevent the ASR component 750 from further processing the audio data 611. In this situation, the audio data 611 can be discarded.

The device 110 may conduct its own speech processing using on-device processing components, such as the ASR component 240 and an NLU 760, similar to the manner discussed above with respect to the ASR component 240 and the NLU component 660 of the system 120. The device 110 may also internally include, or otherwise have access to, other components such as one or more skill components 790 capable of executing commands based on NLU output data or other results determined by the device 110/system 120, a user recognition component 795 (configured to process in a similar manner to that discussed above with respect to the user recognition component 695 of the system 120), profile storage 770 (configured to store similar profile data to that discussed above with respect to the profile storage 670 of the system 120), or other components. In at least some embodiments, the profile storage 770 may only store profile data for a user or group of users specifically associated with the device 110. Similar to as described above with respect to FIG. 6, a skill component 790 may communicate with a skill system(s) 625.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 724, of the device 110, may include a hybrid proxy (HP) 726 configured to proxy traffic to/from the system 120. For example, the HP 726 may be configured to send messages to/from a hybrid execution controller (HEC) 727 of the hybrid selector 724. For example, command/directive data received from the system 120 can be sent to the HEC 727 using the HP 726. The HP 726 may also be configured to allow the audio data 611 to pass to the system 120 while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 750 about the availability of new audio data 611 that represents user speech, and to otherwise initiate the operations of on-device language processing when new audio data 611 becomes available. In general, the hybrid selector 724 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 611 is received, the HP 726 may allow the audio data 611 to pass through to the system 120 and the HP 726 may also input the audio data 611 to the on-device ASR component 750 by routing the audio data 611 through the HEC 727 of the hybrid selector 724, whereby the LRO 728 notifies the ASR component 750 of the audio data 611. At this point, the hybrid selector 724 may wait for response data from either or both of the system 120 or the on-device language processing components. However, the disclosure is not limited thereto, and in some examples the hybrid selector 724 may send the audio data

611 only to the on-device ASR component 750 without departing from the disclosure. For example, the device 110 may process the audio data 611 on-device without sending the audio data 611 to the system 120.

The on-device ASR component 750 is configured to receive the audio data 611 from the hybrid selector 724, and to recognize speech in the audio data 611, and the on-device NLU component 760 is configured to determine a user intent from the recognized speech, and to determine how to act on the user intent by generating NLU output data which may include directive data (e.g., instructing a component to perform an action). Such NLU output data may take a form similar to that as determined by the NLU component 660 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 760) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 611 to the system 120, and the response data from the system 120 may include the unique identifier to identify which natural language user input the response data corresponds.

In at least some embodiments, the device 110 may include, or be configured to use, one or more skill components 790 that may work similarly to the skill component(s) 690 implemented by the system 120. The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 625. For example, a skill system 625 may be located in a remote environment (e.g., separate location) such that the device 110 may only communicate with the skill system 625 via the network(s) 199. However, the disclosure is not limited thereto. For example, in at least some embodiments, a skill system 625 may be configured in a local environment (e.g., home server and/or the like) such that the device 110 may communicate with the skill system 625 via a private network, such as a local area network (LAN).

As used herein, a "skill" may refer to a skill component 790, a skill system 625, or a combination of a skill component 790 and a skill system 625.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)), random forests, isolation forests, and others. As an example, a neural network typically includes an input layer, an output layer and one or more intermediate hidden layers where the input layer is configured to take in a certain kind of data and the output layer is configured to output the desired kind of data resulting from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Figure 8:
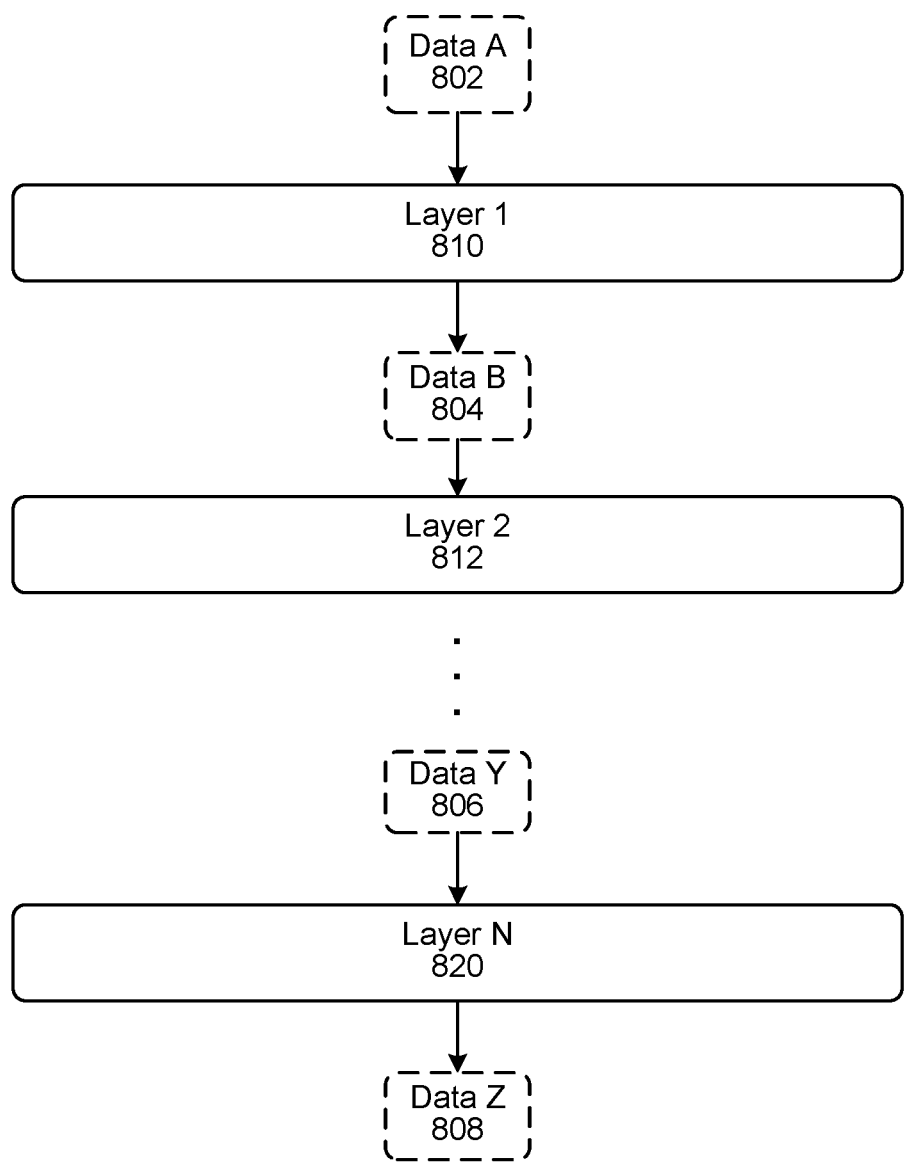
FIG. 8 is a conceptual diagram illustrating layers of a trained model according to embodiments of the present disclosure.

As illustrated in FIG. 8, a neural network may include a number of layers, from input layer 1 810 through output layer N 820. Each layer is configured to output a particular type of data and output another type of data. The neural network illustrated in FIG. 8 is configured to input data of type data A 802 (which is the input to layer 1 810) and output data of type data Z 808 (which is the output from the last layer N 820). The output from one layer is then taken as the input to the next layer. For example, the output data (data B 804) from layer 1 810 is the input data for layer 2 812 and so forth such that the input to layer N 820 is data Y 806 output from the penultimate layer (not shown).

While values for the input data/output data of a particular layer are not known until a neural network is actually operating during runtime, the data describing the neural network describes the structure and operations of the layers of the neural network.

Figure 9:
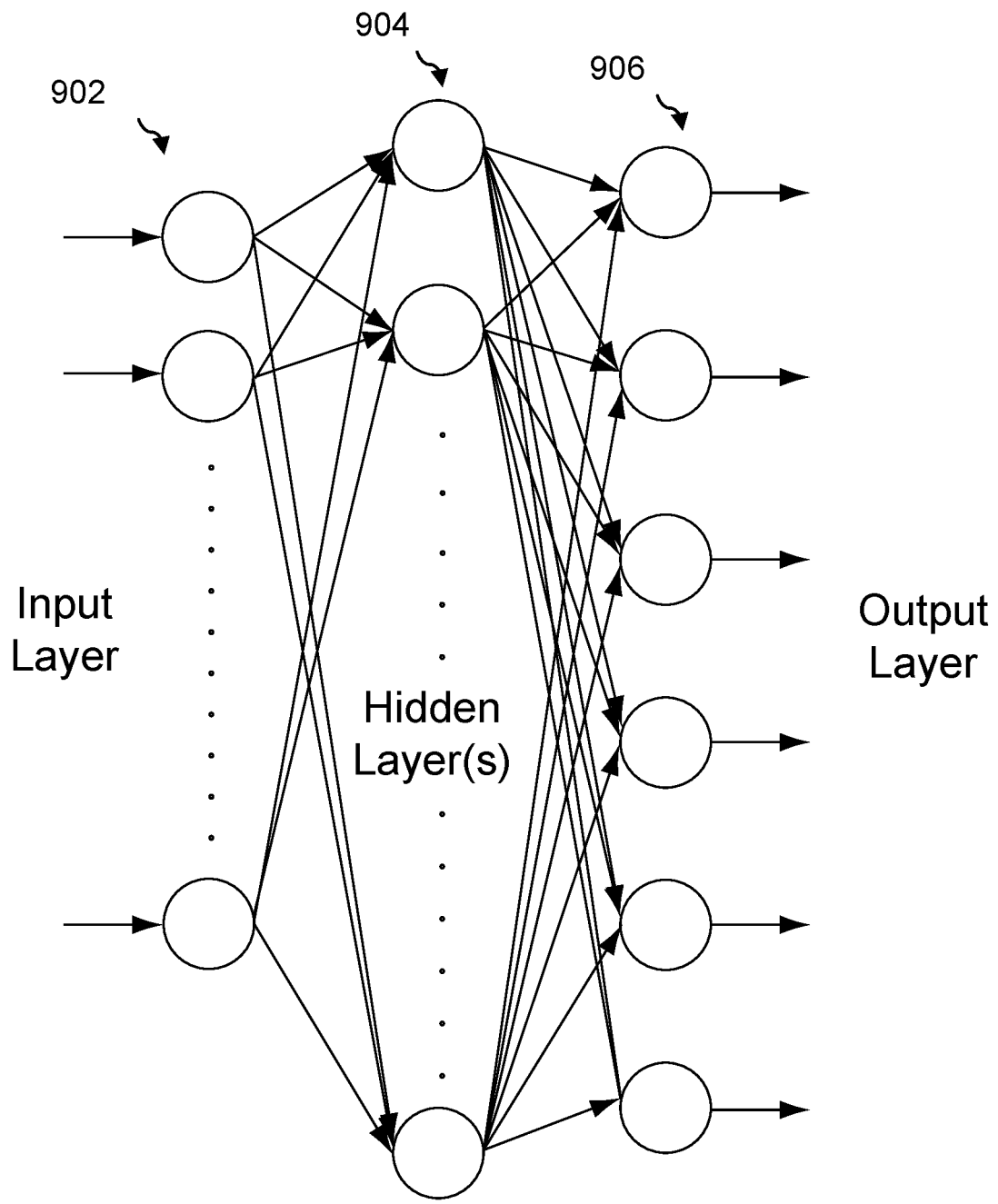
FIG. 9 illustrates a neural network for speech recognition according to embodiments of the present disclosure.

An example neural network for the AEG component 220 and the ASR component 240 is illustrated in FIG. 9. A neural network may be structured with an input layer 902, middle layer(s) 904, and an output layer 906. Each node of the hidden layer is connected to each node in the input layer and each node in the output layer. Although illustrated in FIG. 9 with a single hidden layer, a neural network may include multiple middle layers. In this case each node in a hidden layer may connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 10:
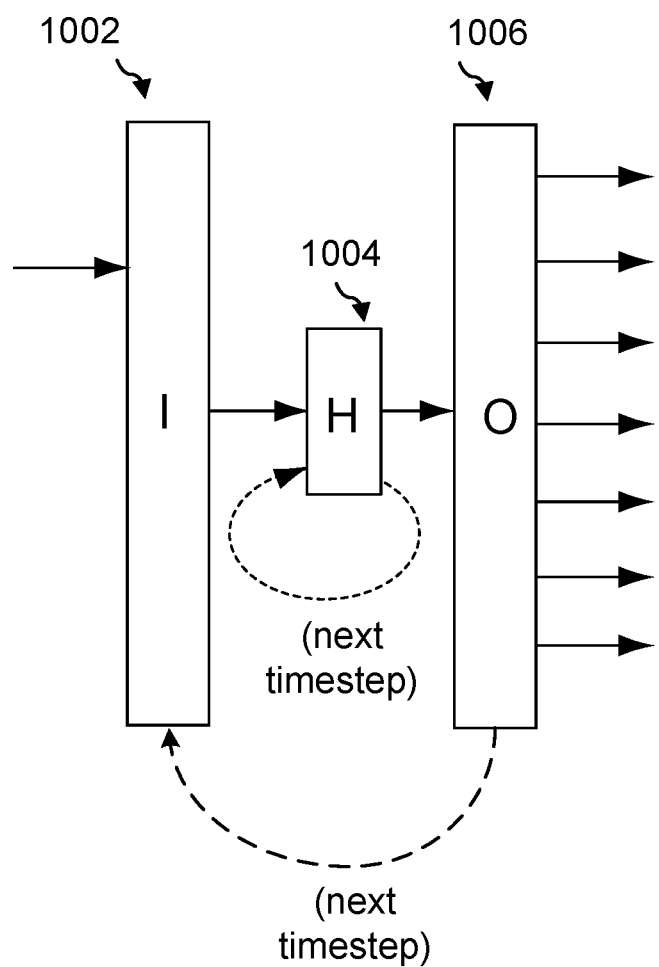
FIG. 10 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 10. Each node of the input layer 1002 connects to each node of the hidden layer 1004. Each node of the hidden layer 1004 connects to each node of the output layer 1006. As illustrated, the output of the hidden layer 1004 is fed back into the hidden layer for processing of the next set of inputs/the next time step. A neural network incorporating recurrent connections may be referred to as a recurrent neural network (RNN). A RNN-transducer model may feed the prediction from the output layer 1006 (or a softmax layer output) to the input layer to process the next set of inputs/the next time step.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 6, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 11:
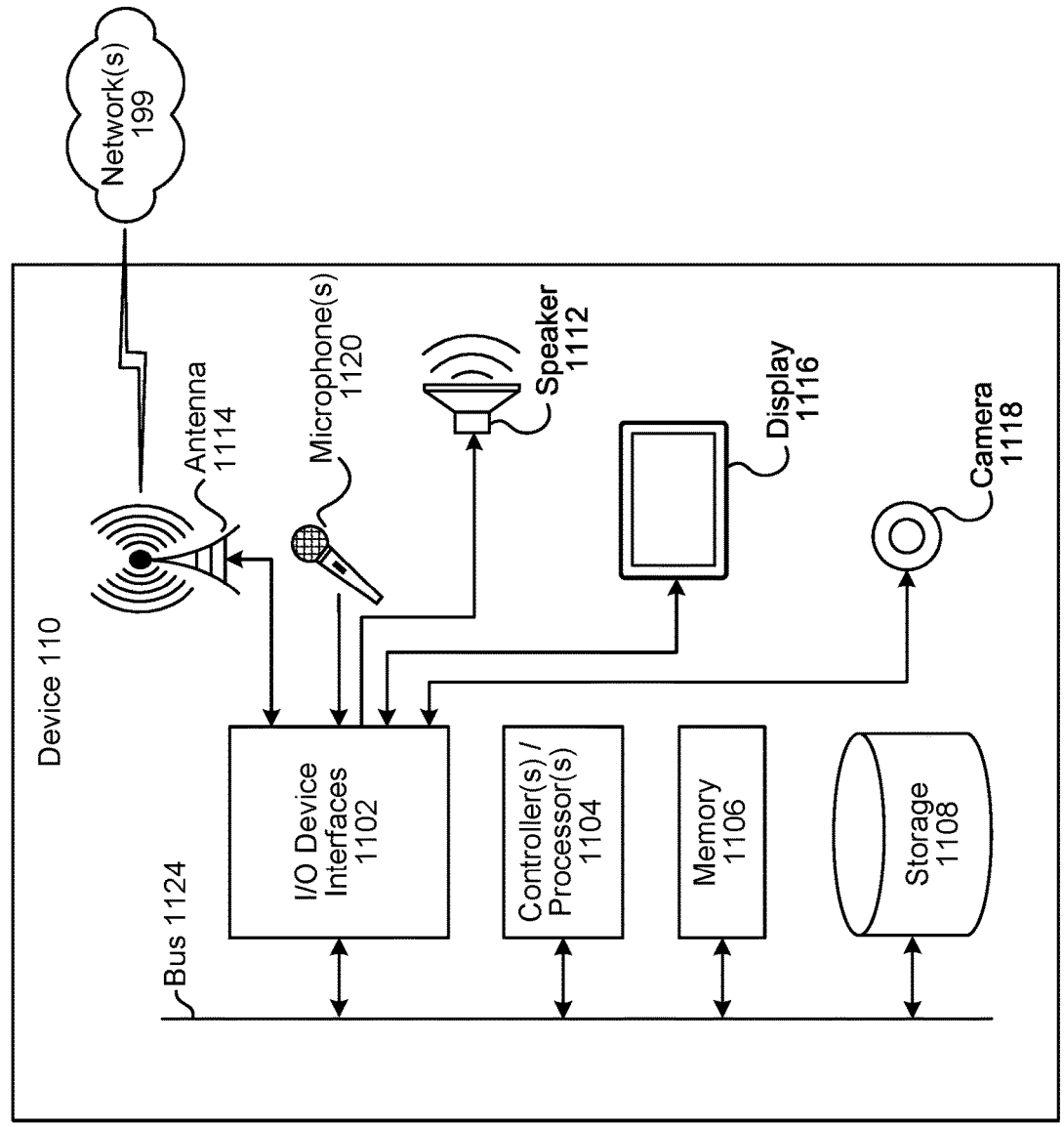
FIG. 11 is a block diagram conceptually illustrating example components of a device, according to embodiments of the present disclosure.
Figure 12:
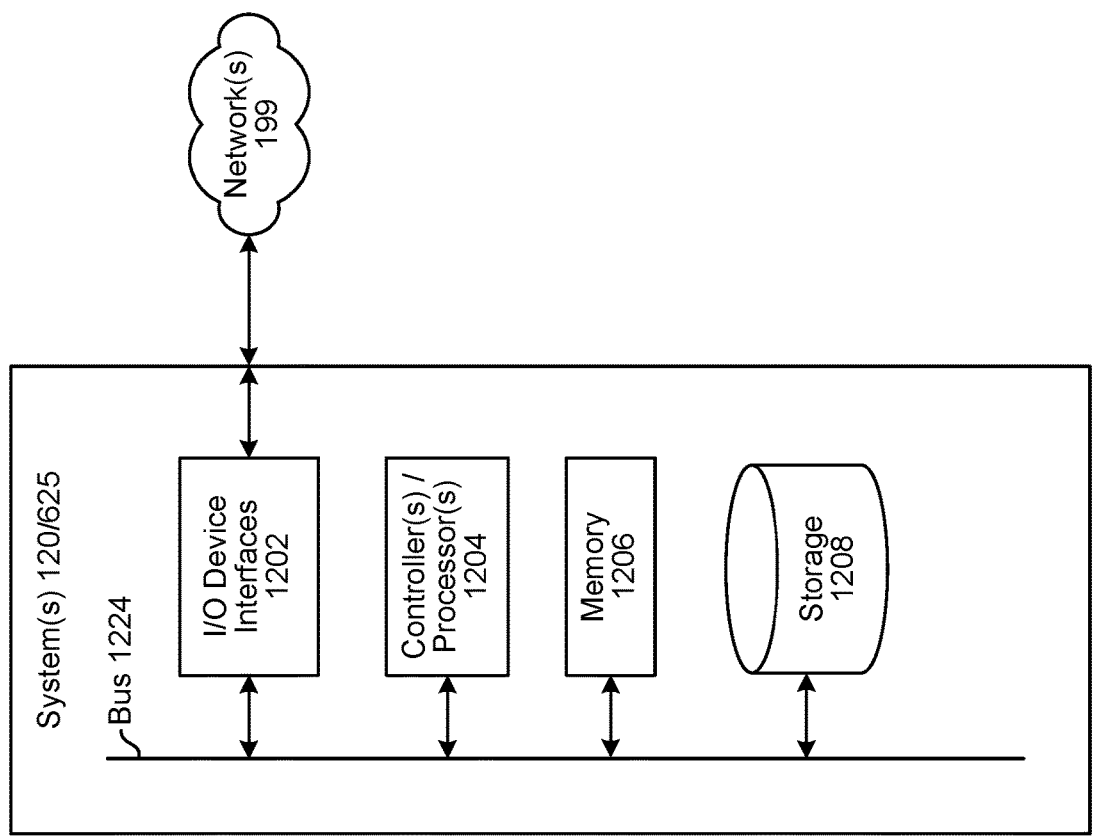
FIG. 12 is a block diagram conceptually illustrating example components of a system, according to embodiments of the present disclosure.

FIG. 11 is a block diagram conceptually illustrating example components of a device 110 according to the present disclosure. FIG. 12 is a block diagram conceptually illustrating example components of a system, such as the system 120 or a skill system 625. A system (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/625) may be included in the system 100 of the present disclosure, such as one or more systems 120 for performing ASR processing, one or more systems 120 for performing NLU processing, and one or more skill systems 625, etc. In operation, each of these systems may include computer-readable and computer-executable instructions that reside on the respective device (120/625), as will be discussed further below.

Each of these devices (110/120/625) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/625) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/625) may also be connected to removable or external non-volatile memory and/or storage (such as a removable memory card, memory key drive, networked storage, etc.) through respective input/output device interfaces (1102/1202).

Computer instructions for operating each device (110/120/625) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/625) includes input/output device interfaces (1102/1202). A variety of components may be connected through the input/output device interfaces (1102/1202), as will be discussed further below. Additionally, each device (110/120/625) may include an address/data bus (1124/1224) for conveying data among components of the respective device. Each component within a device (110/120/625) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 110, the system 120, and/or a skill system 625 may include their own dedicated processors, memory, and/or storage. Alternatively, one or more of the components of the device 110, the system 120, and/or a skill system 625 may utilize the I/O interfaces (1102/1202), processor(s) (1104/1204), memory (1106/1206), and/or storage (1108/1208) of the device(s) 110, system 120, or the skill system 625, respectively. Thus, the ASR component 240 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 625, as described herein, are illustrative, and may be located as a stand-alone device or may be included, in whole or in part, as a component of a larger device or system.

As illustrated in FIG. 13, multiple devices (110a-1101) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, earbuds 1101, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, at a first device, first audio data corresponding to a first portion of a spoken input;
processing, at the first device, the first audio data using a first trained model to generate first embedding data representing acoustic features corresponding to the first audio data, the first embedding data corresponding to at least a first vector output by at least a first layer of the first trained model;
storing the first embedding data in a computer-readable medium;
after storing the first embedding data and prior to performing automatic speech recognition (ASR) processing using the first embedding data, determining, at the first device and using a second trained model configured to detect device-directed speech, that the first audio data includes first device-directed speech;
in response to determining that the first audio data includes the first device-directed speech, retrieving the first embedding data from the computer-readable medium and sending the first embedding data to an ASR component;
processing, using the ASR component, the first embedding data to determine first ASR output data corresponding to the first audio data;
after receiving the first audio data, receiving, at the first device, second audio data corresponding to a second portion of the spoken input;
sending the second audio data to the ASR component; and
processing, using the ASR component, the first ASR output data and the second audio data to determine second ASR output data corresponding to the spoken input.

2. The computer-implemented method of claim 1, further comprising:
receiving, at the first device, third audio data;
processing, at the first device, the third audio data using the first trained model to generate second embedding data representing acoustic features corresponding to the third audio data;
processing, at the first device and using the second trained model, the third audio data to determine the third audio data does not include second device-directed speech;
storing the second embedding data in the computer-readable medium;
after storing the second embedding data and prior to performing ASR processing using the second embedding data, determining, at the first device and using the second trained model, that the second audio data does not include second device-directed speech; and
based on determining the third audio data does not include the second device-directed speech, refraining from sending the second embedding data to the ASR component.

3. The computer-implemented method of claim 1, wherein:
processing the first audio data using the first trained model comprises processing the first audio data using a first neural network model, and
processing the first embedding data using the ASR component comprises processing the first embedding data using a second neural network model, the first neural network model and the second neural network model being jointly trained.

4. A computer-implemented method, comprising:
receiving first audio data;
processing the first audio data using one or more neural networks to generate first embedding data representing acoustic features corresponding to the first audio data, the first embedding data corresponding to at least a first vector output by at least a first layer of the one or more neural networks;
storing the first embedding data in a computer-readable medium;
after storing the first embedding data and prior to performing speech processing using the first embedding data, determining that the first audio data includes first device-directed speech; and
in response to determining that the first audio data includes the first device-directed speech, retrieving the first embedding data from the computer-readable medium and initiating speech processing, by an audio processing component, using the first embedding data.

5. The computer-implemented method of claim 4, further comprising:
receiving second audio data;
generating second embedding data using the second audio data;
storing the second embedding data in the computer-readable medium;
after storing the second embedding data and prior to performing speech processing using the second embedding data, determining that the second audio data does not include second device-directed speech; and
based on determining that the second audio data does not include the second device-directed speech, refraining from initiating speech processing, by the audio processing component, using the second embedding data.

6. The computer-implemented method of claim 4, further comprising:
after receiving the first audio data, receiving, second audio data including a portion of the first device-directed speech; and
processing the second audio data using the audio processing component.

7. The computer-implemented method of claim 4, wherein:
generating the first embedding data includes processing the first audio data using a first trained model to generate the first embedding data; and
determining that the first audio data includes the first device-directed speech includes processing the first audio data using a second trained model to determine that the first audio data includes the first device-directed speech.

8. The computer-implemented method of claim 4, further comprising:
prior to receiving the first audio data, receiving second audio data;
generating second embedding data using the second audio data;
storing the second embedding data in the computer-readable medium; and
processing, using the audio processing component, the first embedding data and the second embedding data in response to determining that the first audio data includes the first device-directed speech and based on a duration of the first audio data.

9. The computer-implemented method of claim 4, wherein:
generating the first embedding data includes processing the first audio data using a first trained model configured to generate the first embedding data.

10. The computer-implemented method of claim 4, further comprising:
processing the first audio data using a first trained model having a first output layer and a second output layer, the first output layer configured to output the first embedding data and the second output layer configured to output an indication representing the first audio data includes the first device-directed speech.

11. The computer-implemented method of claim 4, further comprising:
determining training audio data;
processing the training audio data using a first machine learning (ML) model to determine first model data;
processing the training audio data using a second ML model to determine second model data;
determining updated first model data using the second model data;
determining a first trained model using the updated first model data, the first trained model configured to generate embedding data corresponding to audio data; and
determining a second trained model using the second model data, the second trained model configured to perform ASR processing.

12. A device, comprising:
at least one processor; and
at least one memory including instructions that, when executed by the at least one processor, cause the device to:
receive first audio data;
process the first audio data using one or more neural networks to generate first embedding data representing acoustic features corresponding to the first audio data, the first embedding data corresponding to at least a first vector output by at least a first layer of the one or more neural networks;
store the first embedding data in a computer-readable medium;
after storing the first embedding data and prior to performing speech processing using the first embedding data, determine that the first audio data includes first device-directed speech; and
in response to determining that the first audio data includes the first device-directed speech, retrieve the first embedding data from the computer-readable medium and initiate speech processing, by an audio processing component, using the first embedding data.

13. The device of claim 12, wherein the at least one memory includes further instructions that, when executed by the at least one processor, cause the device to:
receive second audio data;
generate second embedding data using the second audio data;
store the second embedding data in the computer-readable medium;
after storing the second embedding data and prior to performing speech processing using the second embedding data, determine that the second audio data does not include second device-directed speech; and
based on determining that the second audio data does not include the second device-directed speech, refrain from initiating speech processing, by the audio processing component, using the second embedding data.

14. The device of claim 12, wherein the at least one memory includes further instructions that, when executed by the at least one processor, cause the device to:
after receiving the first audio data, receive second audio data including a portion of the first device-directed speech; and
process the second audio data using the audio processing component.

15. The device of claim 12, wherein the at least one memory includes further instructions that, when executed by the at least one processor, cause the device to:
process the first audio data using a first trained model to generate the first embedding data; and
process the first audio data using a second trained model to determine that the first audio data includes the first device-directed speech.

16. The device of claim 12, wherein the at least one memory includes further instructions that, when executed by the at least one processor, cause the device to:
prior to receiving the first audio data, receive second audio data;
generate second embedding data using the second audio data;
store the second embedding data in the computer-readable medium; and
process, using the audio processing component, the first embedding data and the second embedding data in response to determining that the first audio data includes the first device-directed speech and based on a duration of the first audio data.

17. The device of claim 12, wherein the at least one memory includes further instructions that, when executed by the at least one processor, cause the device to:
process the first audio data using a first trained model configured to generate the first embedding data.

18. The device of claim 12, wherein the at least one memory includes further instructions that, when executed by the at least one processor, cause the device to:
process the first audio data using a first trained model having a first output layer and a second output layer, the first output layer configured to output the first embedding data and the second output layer configured to output an indication representing the first audio data includes the first device-directed speech.

19. The device of claim 12, wherein the at least one memory includes further instructions that, when executed by the at least one processor, cause the device to:
   determine training audio data;
   process the training audio data using a first machine learning (ML) model to determine first model data;
   process the training audio data using a second ML model to determine second model data;
   determine updated first model data using the second model data;
   determine a first trained model using the updated first model data, the first trained model configured to generate embedding data corresponding to audio data; and
   determine a second trained model using the second model data, the second trained model configured to perform ASR processing.

* * * * *